US010943723B2

(12) United States Patent
Pagenkopf

(10) Patent No.: US 10,943,723 B2
(45) Date of Patent: Mar. 9, 2021

(54) NOISE REDUCING AND COOLING ENCLOSURE

(71) Applicant: Hubbell Incorporated, Shelton, CT (US)

(72) Inventor: Kenneth Edward Pagenkopf, Shorewood, WI (US)

(73) Assignee: HUBBELL INCORPORATED SHEL'K, Shelton, CT (US)

(*) Notice: Subject to any disclaimer, the term of this patent is extended or adjusted under 35 U.S.C. 154(b) by 524 days.

(21) Appl. No.: 15/464,444

(22) Filed: Mar. 21, 2017

(65) Prior Publication Data

US 2017/0271068 A1 Sep. 21, 2017

Related U.S. Application Data

(60) Provisional application No. 62/310,868, filed on Mar. 21, 2016.

(51) Int. Cl.
*H01F 27/33* (2006.01)
*H01F 27/02* (2006.01)
(Continued)

(52) U.S. Cl.
CPC ............ *H01F 27/025* (2013.01); *B32B 1/02* (2013.01); *B32B 5/18* (2013.01); *B32B 5/32* (2013.01);
(Continued)

(58) Field of Classification Search
CPC ......... H01F 27/025; H01F 27/33; B32B 5/18; B32B 1/02; B32B 5/32; B32B 15/046; B32B 2250/04; B32B 2439/62; B32B 2250/44; B32B 2266/057; B32B 15/20; B32B 2266/045; B32B 2307/102; B32B 2307/302; B32B 2439/00; B32B 2250/02; B32B 2250/03; B32B 2266/0207; B32B 2266/0214; B32B 2266/08; B32B 7/02; B32B 7/12; B32B 3/266; G10K 11/168
See application file for complete search history.

(56) References Cited

U.S. PATENT DOCUMENTS 2,192,653 A 3/1940 Shenk
5,060,114 A 10/1991 Feinberg et al.
(Continued)

FOREIGN PATENT DOCUMENTS

WO 1999063169 12/1999
WO WO-9963169 A2 * 12/1999 ............... E04B 1/86
(Continued)

OTHER PUBLICATIONS

Science of Noise Boom Mat Product Literature, Feb. 1, 2015.
(Continued)

*Primary Examiner* — Tuyen T Nguyen
(74) *Attorney, Agent, or Firm* — Wissing Miller LLP

(57) ABSTRACT

The present disclosure provides descriptions of configurations for noise reducing and cooling enclosures and enclosure material. The noise reducing and cooling enclosures seal and passively acoustically quiet acoustic energy generated by one or more noise emitting devices within the enclosure, and dissipate heat generated by the devices through conduction by use of composite enclosure materials.

7 Claims, 18 Drawing Sheets

(51) Int. Cl.
    *B32B 5/18*     (2006.01)
    *B32B 1/02*     (2006.01)
    *B32B 5/32*     (2006.01)
    *B32B 15/04*    (2006.01)
    *G10K 11/168*   (2006.01)
    *B32B 15/20*    (2006.01)

(52) U.S. Cl.
    CPC .......... *B32B 15/046* (2013.01); *G10K 11/168* (2013.01); *H01F 27/33* (2013.01); *B32B 15/20* (2013.01); *B32B 2250/04* (2013.01); *B32B 2250/44* (2013.01); *B32B 2266/045* (2013.01); *B32B 2266/057* (2016.11); *B32B 2307/102* (2013.01); *B32B 2307/302* (2013.01); *B32B 2439/00* (2013.01); *B32B 2439/62* (2013.01)

(56) References Cited

U.S. PATENT DOCUMENTS

| | | |
|---|---|---|
| 5,510,954 A | 4/1996 | Wyler |
| 5,570,006 A | 10/1996 | Woodworth |
| 6,183,837 B1 | 2/2001 | Kim |
| 6,568,135 B1 | 5/2003 | Yokoyama et al. |
| 9,253,925 B1 | 2/2016 | Smith |
| 2004/0119410 A1 | 6/2004 | Jun et al. |
| 2010/0155016 A1 | 6/2010 | Wood et al. |
| 2011/0159261 A1 | 6/2011 | Sugimoto et al. |
| 2013/0001460 A1 | 1/2013 | Tomiyama et al. |
| 2013/0210301 A1 | 8/2013 | Hirao |

FOREIGN PATENT DOCUMENTS

| | | | | |
|---|---|---|---|---|
| WO | WO2009066889 | * | 5/2005 | |
| WO | WO-2009066889 A1 | * | 5/2009 | ............ E04C 2/243 |
| WO | WO-2015121319 A1 | * | 8/2015 | |

OTHER PUBLICATIONS

International Search Report and Written Opinion mailed in corresponding PCT Application PCT/US2017/023293 dated Jun. 5, 2017, 9 pages.

* cited by examiner

NOISE REDUCING AND COOLING ENCLOSURE

CROSS REFERENCE TO RELATED APPLICATIONS

The present application is based on and claims benefit from U.S. Provisional Application Ser. No. 62/310,868 filed Mar. 21, 2016 entitled "Noise Reducing and Cooling Enclosure" the entire contents of which are herein incorporated by reference.

BACKGROUND

Field

The present disclosure relates generally to acoustically quieting enclosures for devices that generate high levels of acoustic energy. More particularly, the present disclosure relates to enclosures and enclosure materials that acoustically quiet acoustic energy generated by noise emitting devices and that conduct any heat generated by such devices out of the enclosure.

Description of the Related Art

Audible noise generated by certain electrical devices is typically caused by electromagnetic coils and magnetic cores within such devices. Electrical current in such devices generates flux density and subsequent mechanical forces that can make electromagnetic components vibrate. An electromagnetic coil and core structure also has a resonance at which the coil tends to physically vibrate which may produce sounds audible at a distance from the coil, especially if magnified by a mechanical resonance in the devices or in the enclosure housing the coil. The level of audible noise may increase as the current passing through the coil increases, or as the current nears the mechanical resonant frequency of the coil. An electrical device with heavy currents passed through its coil is likely to produce audible noise that can be objectionable in some classes of equipment. Systems developed to reduce such coil noise rely on either active noise cancelling systems, heat exchangers with ventilation baffles, or fan cooled sealed enclosures.

SUMMARY

The present disclosure provides descriptions of configurations for noise reducing and cooling enclosures. The noise reducing and cooling enclosures seal and passively acoustically quiet acoustic energy generated by noise emitting devices within the enclosure, and conduct heat generated by such devices through the walls, e.g., plate assemblies, of the enclosure to dissipate heat generated by such devices.

In one exemplary configuration, the enclosure includes a base plate assembly, a top plate assembly, left and right side plate assemblies, and front and rear plate assemblies. In this exemplary configuration, acoustic energy generated by the noise emitting devices is acoustically quieted, and any heat generated by such devices is conducted through the plate assemblies and dissipated via ambient air.

The base plate assembly has a first layer formed of a rigid, thermally conductive and acoustic blocking material, a second layer made of a rigid, thermally conductive material, a third layer made of a thermally conductive and acoustic quieting material, and a fourth layer made of a thermally conductive and acoustic quieting material. The top plate assembly has a first layer formed of a rigid, thermally conductive and acoustic blocking material, a second layer made of a rigid, thermally conductive material, a third layer made of a thermally conductive and acoustic quieting material, and a fourth layer made of a thermally conductive and acoustic quieting material. The left side plate assembly has a first layer formed of a rigid, thermally conductive and acoustic blocking material, a second layer made of a thermally conductive and acoustic quieting material, and a third layer made of a thermally conductive and acoustic quieting material. The right side plate assembly has a first layer formed of a rigid thermally conductive and acoustic blocking material, a second layer made of a thermally conductive and acoustic quieting material, and a third layer made of a thermally conductive and acoustic quieting material. The rear plate assembly has a first layer made of a rigid, acoustic blocking material, and a second layer made of an acoustic quieting material. The front plate assembly has a first layer made of a rigid, acoustic blocking material, and a second layer made of an acoustic quieting material.

In another configuration, the enclosure includes a plurality of composite plate assemblies secured together to form the enclosure, wherein each of the composite plate assemblies are made of materials that acoustically quiet acoustic energy, and wherein at least one of the plurality of composite plates assemblies conducts heat from an interior of the enclosure to an exterior of the enclosure.

The present disclosure also provides descriptions of configurations for one or more noise emitting devices housed within an enclosure. The enclosure includes a base plate assembly, a top plate assembly, left and right side plate assemblies, and front and rear plate assemblies. In this exemplary configuration, acoustic energy generated by the noise emitting devices is acoustically quieted, and any heat generated by such devices is conducted through the plate assemblies and dissipated via ambient air.

The base plate assembly has a first layer formed of a rigid, thermally conductive and acoustic blocking material, a second layer made of a rigid, thermally conductive material, a third layer made of a thermally conductive and acoustic quieting material, and a fourth layer made of a thermally conductive and acoustic quieting material. The top plate assembly has a first layer formed of a rigid, thermally conductive and acoustic blocking material, a second layer made of a rigid, thermally conductive material, a third layer made of a thermally conductive and acoustic quieting material, and a fourth layer made of a thermally conductive and acoustic quieting material. The left side plate assembly has a first layer formed of a rigid thermally conductive and acoustic blocking material, a second layer made of a thermally conductive and acoustic quieting material, and a third layer made of a thermally conductive and acoustic quieting material. The right side plate assembly has a first layer formed of a rigid thermally conductive and acoustic blocking material, a second layer made of a thermally conductive and acoustic quieting material, and a third layer made of a thermally conductive and acoustic quieting material. The rear plate assembly has a first layer made of a rigid, acoustic blocking material, and a second layer made of an acoustic quieting material. The front plate assembly has a first layer made of a rigid, acoustic blocking material, and a second layer made of an acoustic quieting material.

The present disclosure also provides descriptions of configurations for one or more composite materials used for blocking and acoustically quieting acoustic energy and conducting heat when building the enclosures. The composite material may include a first layer formed of a rigid thermally conductive and acoustic blocking material, and a second layer made of a thermally conductive and acoustic quieting material.

BRIEF DESCRIPTION OF THE DRAWINGS

The figures depict configurations for purposes of illustration only. One skilled in the art will readily recognize from the following description that alternative configurations of the structures illustrated herein may be employed without departing from the principles described herein, wherein.

DETAILED DESCRIPTION

Figure 1:
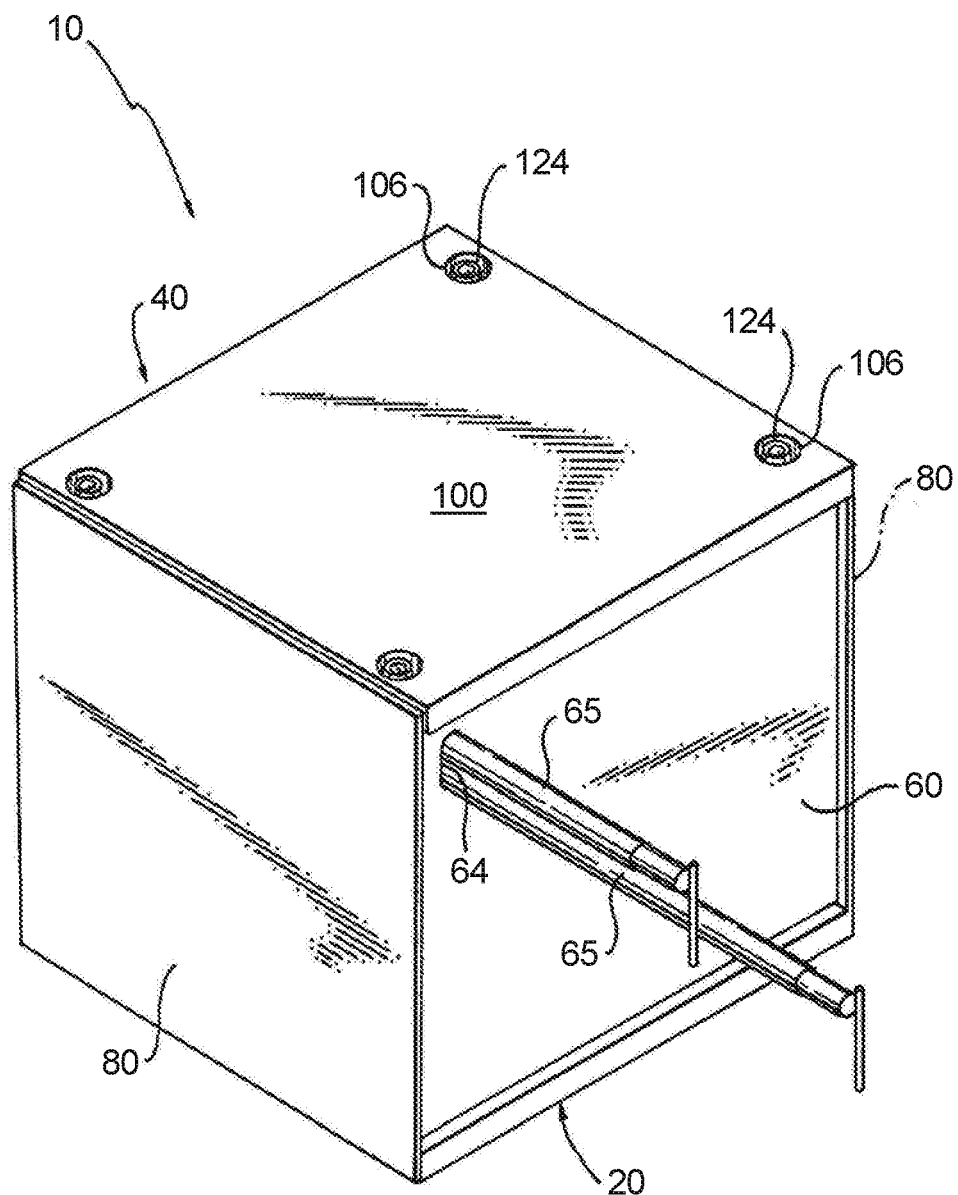
FIG. 1 is a front perspective view of an exemplary configuration of a noise reducing and cooling enclosure according to the present disclosure.

The present disclosure provides descriptions of configurations for noise reducing and cooling enclosures. The noise reducing and cooling enclosures seal and passively dampen and block audible noise generated by noise emitting devices (or components) within the noise reducing and cooling enclosure from escaping the enclosure. For ease of description, the noise reducing and cooling enclosure may also be referred to herein as the "enclosure," and the "noise emitting devices or components" may also be referred to herein in the singular as the "device" or in the plural as the "devices." The enclosure also allows heat generated by the devices within the enclosure to escape through conduction. The enclosure is constructed of thermally conductive and acoustic quieting materials and/or acoustic blocking materials, and is used to enclose one or more devices. Examples of such noise emitting devices include electrical devices, such as inductors and transformers.

For the purpose of the present disclosure, acoustic quieting material is a material capable of isolating, dampening and/or absorbing sounds waves, vibrations or any other acoustic energy (collectively "acoustic energy") to limit or prevent the acoustic energy from transferring out of an area. Acoustic quieting capability is the capability to isolate, dampen and/or absorb acoustic energy to limit or prevent the acoustic energy from transferring out of an area. Acoustically quieting and variations thereof is the isolating, dampening and/or absorbing of acoustic energy to limit or prevent the acoustic energy from transferring out of an area. For the purpose of the present disclosure, acoustic blocking material is a material capable of creating a barrier that stops, reflects, or reroutes acoustic energy to substantially limit or prevent its transmission through a surface. Acoustic blocking capability is the capability to stop, reflect, or reroute acoustic energy to substantially limit or prevent its transmission through a surface. Acoustically blocking and variations thereof is the stopping, reflecting, or rerouting of acoustic energy to substantially limit or prevent its transmission through a surface.

Referring to FIGS. 1-5, an exemplary configuration of an enclosure according to the present disclosure is shown. In this exemplary configuration, the enclosure 10 includes a base plate assembly 20, a left side assembly 40, a right side assembly 60, front and rear plate assemblies 80, and a top plate assembly 100. The various plate assemblies are secured together as described herein to form the enclosure. The dimensions and shape of the enclosure 10 may vary depending upon the device or devices to be housed within the enclosure. For example, the enclosure may be substantially square or rectangular in shape with dimensions of about 9 inches×8 inches×8 inches to house a sine wave inductor, manufactured by Hubbell Incorporated.

Figure 6:
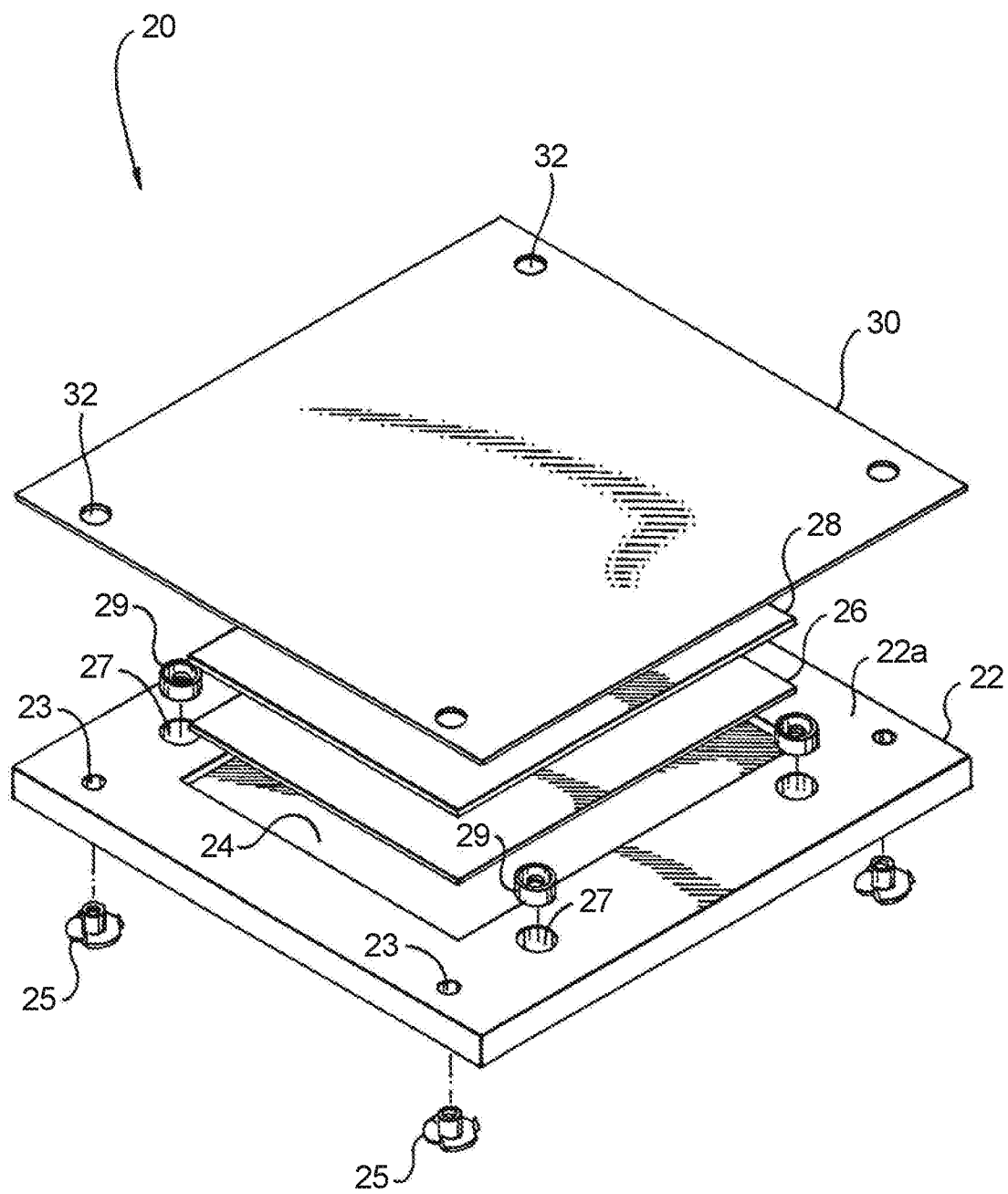
FIG. 6 is a perspective view of an exemplary configuration of a base plate assembly used in the noise reducing and cooling enclosure of FIG. 1.
Figure 7:
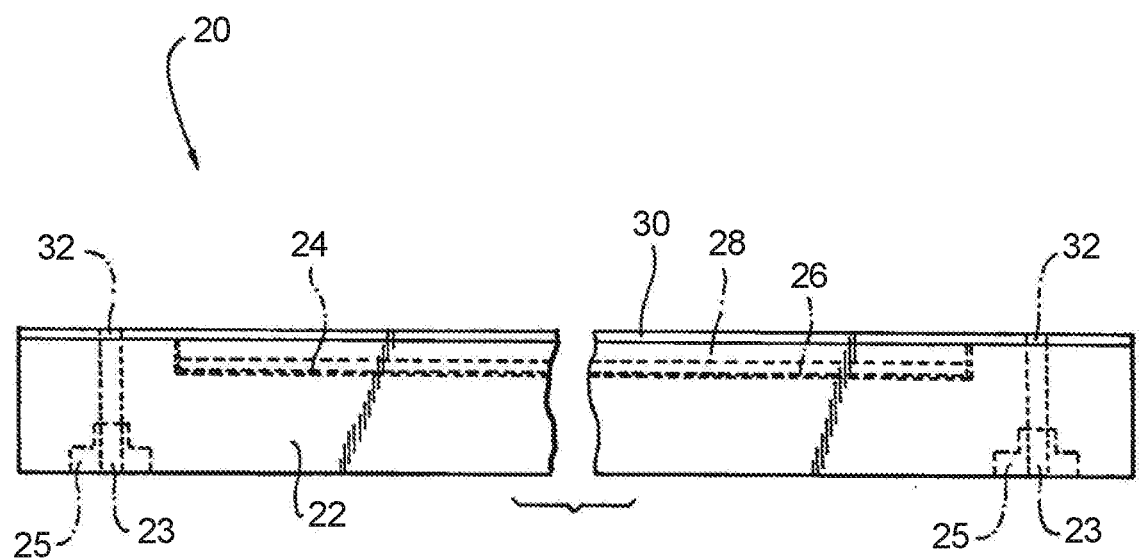
FIG. 7 is a side elevation view of the base plate assembly of FIG. 6.
Figure 8:
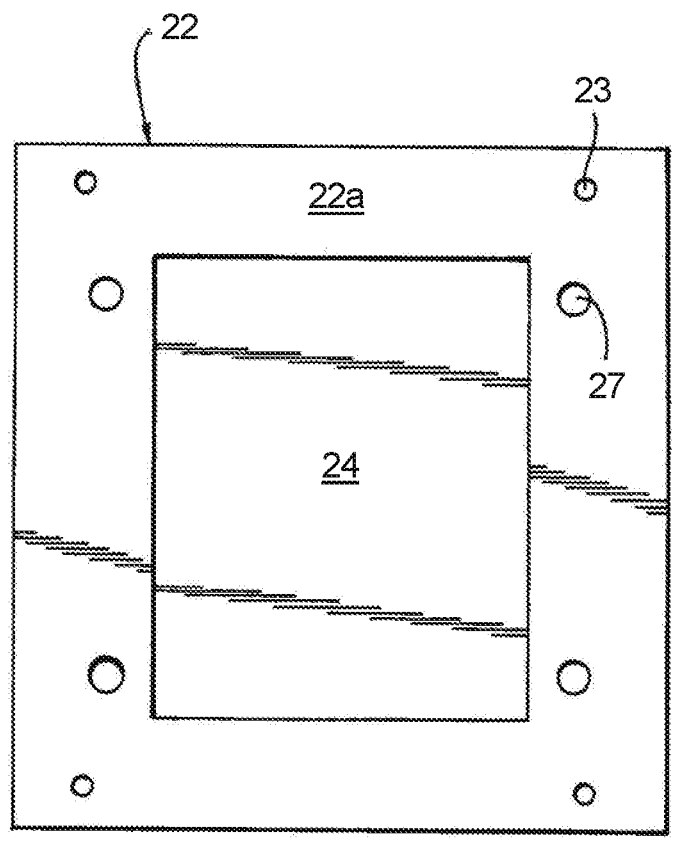
FIG. 8 is a plan view of an inner surface of a base of the base plate assembly of FIG. 6.
Figure 9:
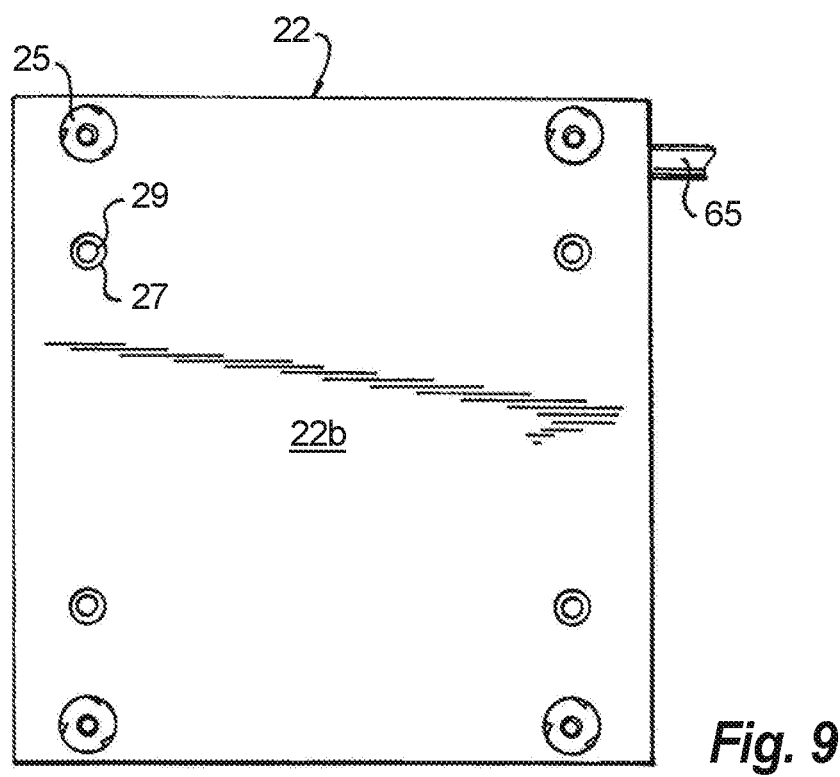
FIG. 9 is a plan view of an outer surface of a base of the base plate assembly of FIG. 6.
Figure 10:
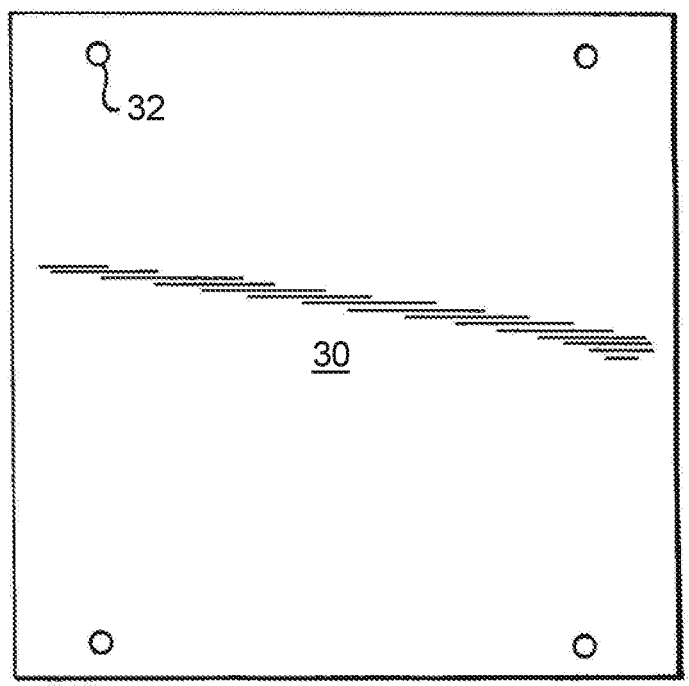
FIG. 10 is a plan view of an inner surface of an inner layer of the base plate assembly of FIG. 6.

Referring to FIGS. 6-10, the base plate assembly 20 is a composite comprised of multiple layers. In this exemplary configuration, the base plate assembly comprises four layers. The first layer is an outer base 22 made of a rigid material having acoustic blocking capability and the capability to conduct heat from an inside surface 22a of the first layer to an outer surface 22b (seen in FIG. 9) of the first layer. An example of a rigid material having acoustic blocking capability and the capability to conduct heat is aluminum foam. An example of an aluminum foam material is the Cymat Stabilized Aluminum Foam marketed under the trade name Smartmetal™ by Cymat Technologies, Ltd. Another example of the aluminum foam is described in U.S. Pat. No. 6,183,837, which is incorporated herein in its entirety by reference. The first layer 22 has a recess 24 (seen in FIGS. 6, 7 and 8) in the inside surface 22a configured to receive a second layer 26 and a third layer 28 of the base plate assembly 20, so as to position the second layer 26 and the third layer 28 relative to the first layer 22, as seen in FIG. 7. The positioning of the second layer and the third layer is such that the one or more devices 12 (seen in FIG. 3) to be housed within the enclosure rest on the base plate assembly 20 above the recess 24. Around the perimeter of the first layer 22 near the corners are apertures 23 for receiving threaded recess nuts 25, e.g., Cold Rolled Steel (CRS) Tee nuts that are inserted into the apertures 23 from the outer surface 22b of the first layer 22, as shown in FIGS. 7-9. The nuts 25 are used to secure the base plate assembly 20 to the top plate assembly 100, as described herein below. The first layer 22 also includes mounting holes 27 in which threaded nuts 29 are inserted and secured using, for example, an adhesive. The threaded nuts 29, e.g., rivnuts, can be used to mount one or more devices within the enclosure 10, if necessary.

The second layer 26 of the base plate assembly 20 is a plate made of a rigid, thermally conductive material, such as a thermally conductive metal. An example of a thermally conductive metal is aluminum. The second layer 26 is configured to fit within the recess 24 in the first layer 22, as shown in FIGS. 6 and 7, and conducts heat to the first layer 22. The second layer 26 also provides additional structural integrity to the base plate assembly 20 to better support the one or more devices 12, shown in FIGS. 3 and 5, within the enclosure 10.

The third layer 28 of the base plate assembly 20 is dimensioned to be about the same size as the second layer 26, but may have a different thickness. The third layer 28 rests on the second layer 26 within the recess 24, as shown in FIGS. 6 and 7. The third layer 28 is preferably a thermal pad. The thermal pad, which is also known as a thermally conductive pad, is a plate made of a highly conformable, low hardness solid material, such as a silicone based material, that can conduct heat from within the enclosure 10 toward the second layer 26. The third layer 28 may also include acoustic quieting capability to assist in reducing acoustic energy, e.g., audible noise, generated by the one or more devices within the enclosure 10. The third layer 28 can also fill air gaps between the second layer 26 and the fourth layer 30, which may be caused by imperfect surfaces, to ensure thermal contact between the layers. An example of a suitable thermal pad is the Gap Pad VO Ultra Soft thermal pad, manufactured by Henkel Electronics Materials, LLC.

The fourth layer 30 of the base plate assembly 20 is an inner plate made of a material that can conduct heat and acoustically quiet acoustic energy, e.g., audible noise, on which devices to be housed within the enclosure 10 may rest or contact. The fourth layer 30 is preferably a thermal foam, e.g., a thermally conductive silicone sponge material that can conduct heat and acoustically quiet acoustic energy, e.g., audible noise. An example of a suitable thermal foam material is the ThermaCool® R10404 thermally conductive closed cell silicone sponge rubber, manufactured by Saint-Gobain Performance Plastics Corporation. The fourth layer 30 and the first layer 22 sandwich the second layer 26 and the third layer 28 within the recess 24 in the first layer 22. Around the perimeter of the fourth layer 30 near the corners are apertures 32 that are aligned with apertures 23 in first layer 22, and used when securing the base plate assembly 20 to the top plate assembly 100. The fourth layer 30 may be secured to the third layer 28 and portions of the first layer 22 using an adhesive, such as an acrylic adhesive that may be part of the second layer 26 or applied to the second layer. The fourth layer 30 dampens noise generated by the one or more devices 12 within the enclosure 10, and conducts heat generated by the one or more devices within the enclosure 10 to the third layer 28 in the area of the recess 24, and to the first layer 22 in places where the fourth layer 30 is in direct contact with the first layer 22.

With the multi-layer base plate assembly 20, heat generated within the enclosure 10 is conducted through the inner fourth layer 30 to the third layer 28 which conducts the heat to the second layer 26, and from the fourth layer 30 to the first layer 22 in areas where the fourth layer is in direct contact with the first layer. The second layer 26 conducts heat to the first layer 22 which dissipates the heat through ambient air. Further, acoustic energy, e.g., audible noise, generated by the one or more devices within the enclosure 10 is acoustically quieted by the fourth layer 30, and further acoustically quieted by the third layer 28, and then acoustically blocked from exiting the enclosure 10 by the first layer 22.

Figure 11:
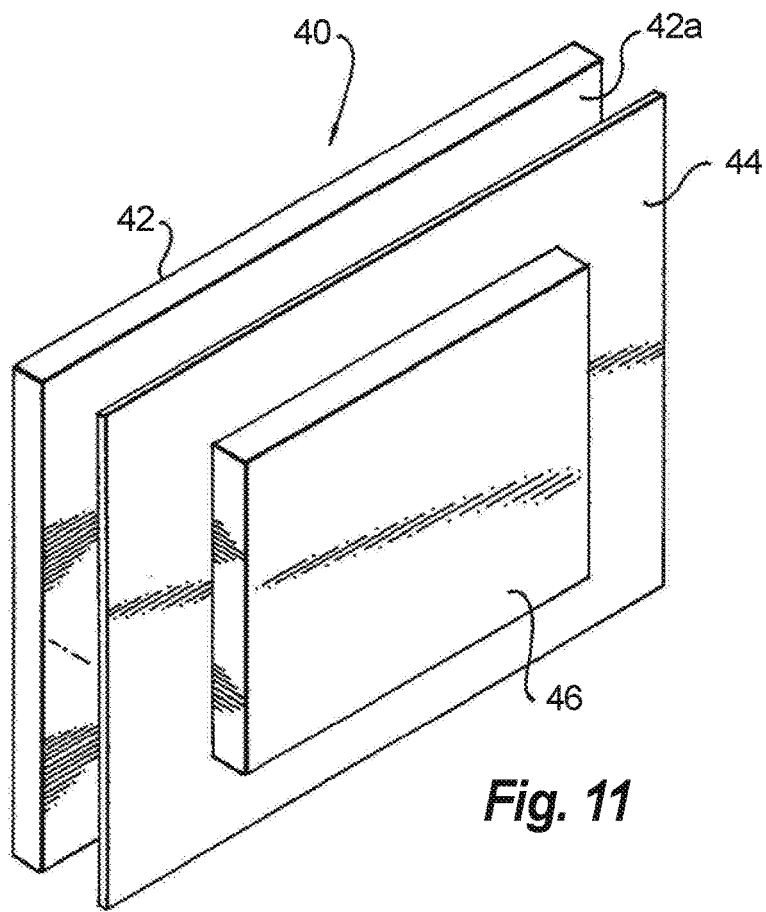
FIG. 11 is a perspective view of an exemplary configuration of a left side plate assembly used in the noise reducing and cooling enclosure of FIG. 1.
Figure 13:
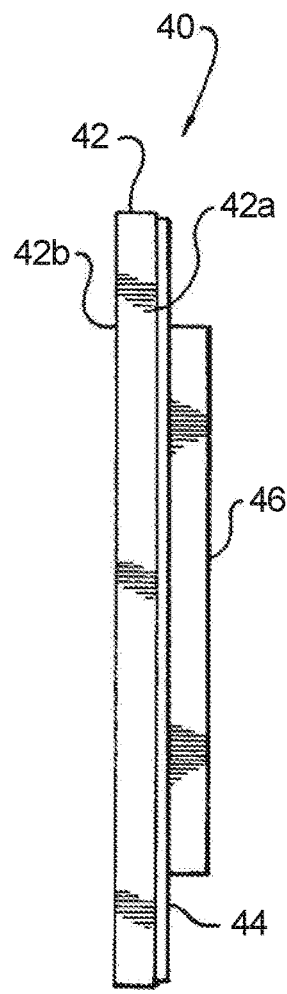
FIG. 13 is a side elevation view of the left side plate assembly of FIG. 11.
Figure 12:
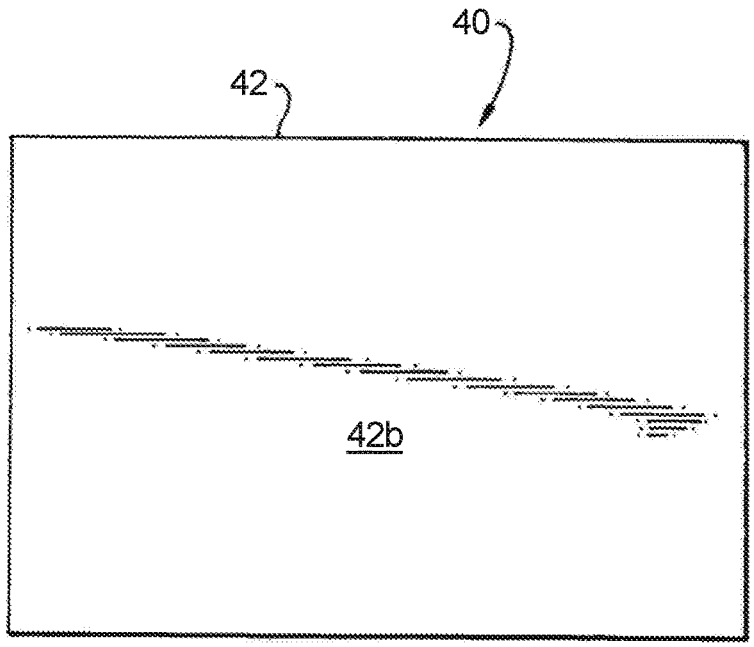
FIG. 12 is a plan view of a side wall of the left side plate assembly of FIG. 11.

Referring to FIGS. 11-13, the left side plate assembly 40 is a composite comprised of multiple layers. In this exemplary configuration, the left side plate assembly 40 comprises three layers. The first layer is an outer side wall 42 made of a rigid material having acoustic blocking capability and the capability to conduct heat from an inside surface 42a of the side wall 42 to an outer surface 42b of the side wall 42. An example of a rigid material having acoustic blocking capability and the capability to conduct heat is the aluminum foam described above.

The second layer 44 of the left side plate assembly 40 is a plate made of a material that can conduct heat and acoustically quiet acoustic energy, e.g., audible noise, such as the thermal foam described above. The second layer 44 may be secured to the first layer 42 using an adhesive, such as an acrylic adhesive that may be part of the second layer 44 or applied to the second layer. The second layer 44 acoustically quiets acoustic energy, e.g., audible noise, generated by the one or more devices within the enclosure 10, and conducts heat generated by the one or more devices 12 within the enclosure 10 to the first layer 42. The second layer 44 is preferably a thermally conductive silicone sponge material that can conduct heat and acoustically quiet acoustic energy, e.g., audible noise, as described above.

The third layer 46 of the left side plate assembly 40 is preferably a thermal pad, and is similar to the third layer 28 described above. The third layer 46 may be secured to the second layer 44 using an adhesive, such as an acrylic adhesive that may be part of the third layer 46 or applied to the third layer. The third layer 46 is made of a highly conformable, low hardness solid material, such as a silicone based material that can conduct heat from within the enclosure 10 toward the second layer 44. The third layer 46 may also include acoustic quieting capability to assist in reducing audible noise generated by one or more devices 12 within the enclosure 10.

With the multi-layer left side plate assembly 40, heat generated within the enclosure 10 is conducted through the inner third layer 46 to the second layer 44. Heat from the second layer 44 is conducted to the first layer 42, which dissipates the heat through the ambient air. Further, acoustic energy, e.g., audible noise, generated by the one or more devices within the enclosure 10 is acoustically quieted by the third layer 46, and further acoustically quieted by the second layer 44, and then acoustically blocked from exiting the enclosure 10 by the side wall 42.

Figure 2:
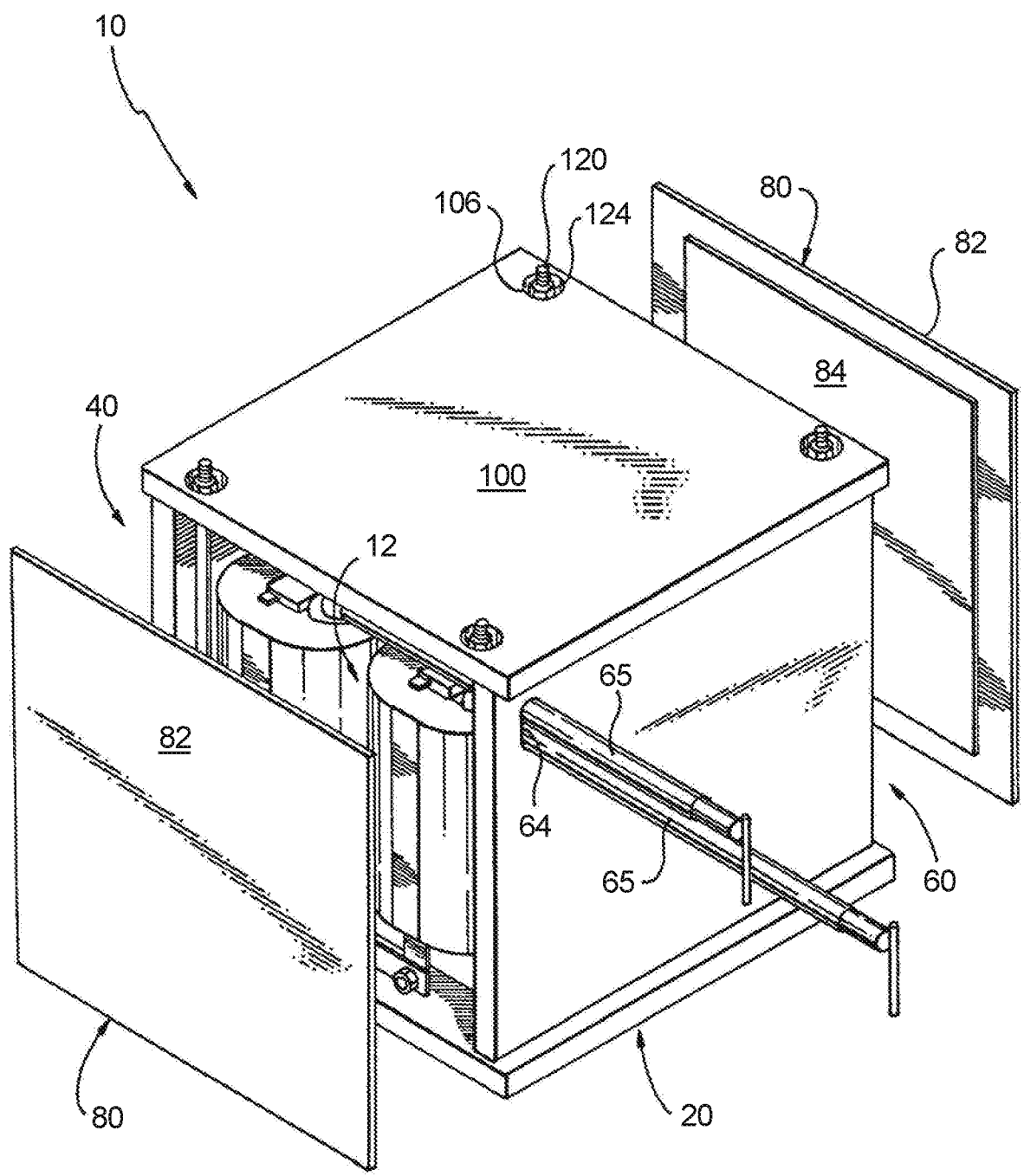
FIG. 2 is a front perspective view of the noise reducing and cooling enclosure of FIG. 1 with the front plate assembly and a rear plate assembly separated from the enclosure.
Figure 14:
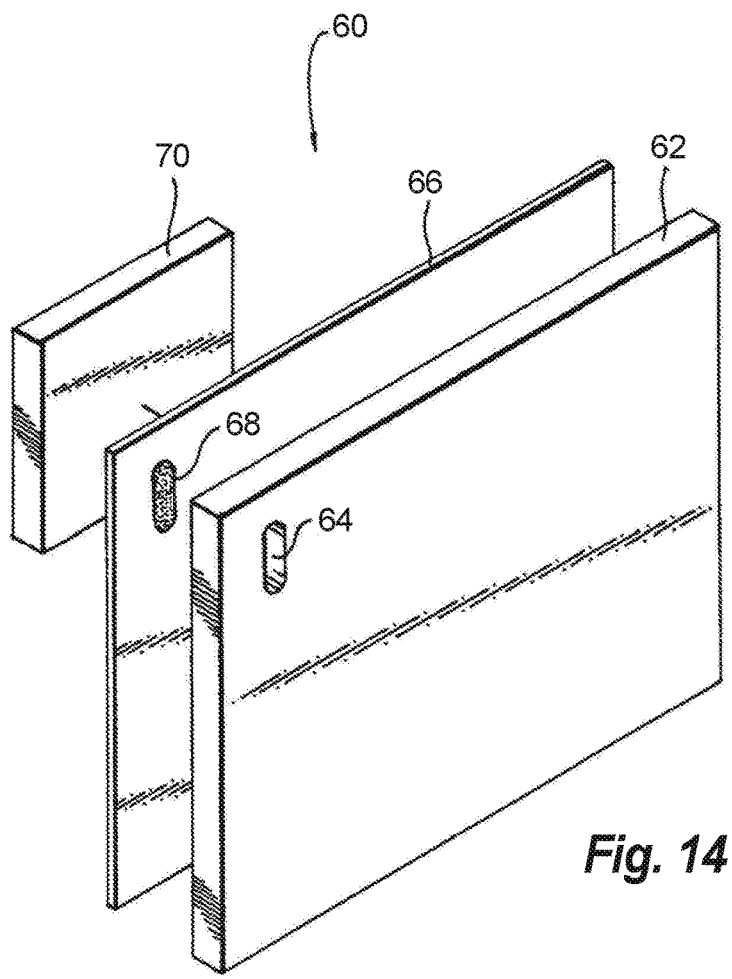
FIG. 14 is a perspective view of an exemplary configuration of a right side plate assembly used in the noise reducing and cooling enclosure of FIG. 1.
Figure 16:
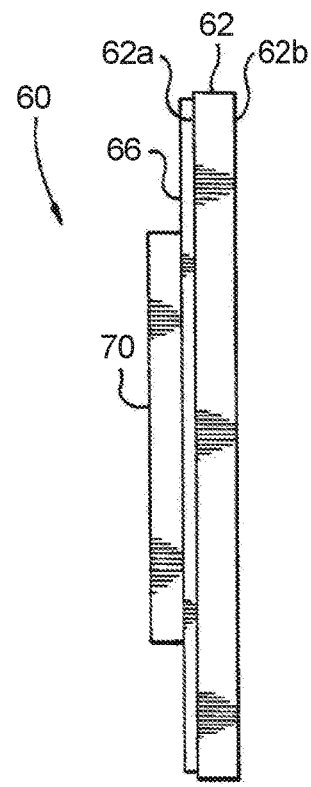
FIG. 16 is a side elevation view of the right side plate assembly of FIG. 14.
Figure 15:
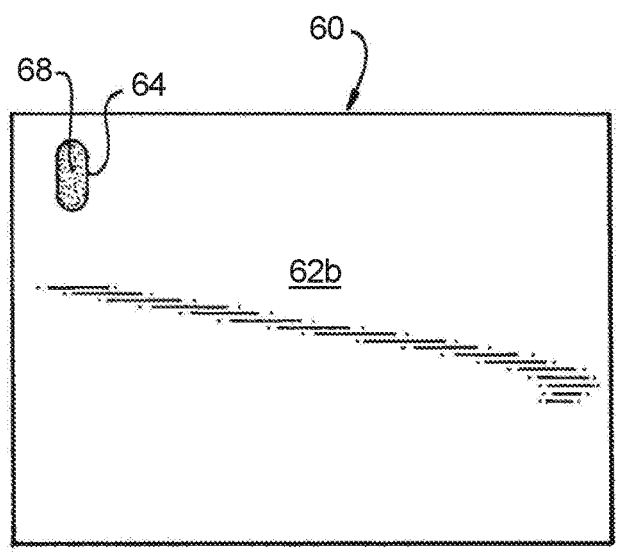
FIG. 15 is a plan view of a side wall of the right side plate assembly of FIG. 14.
Figures 17, 18:
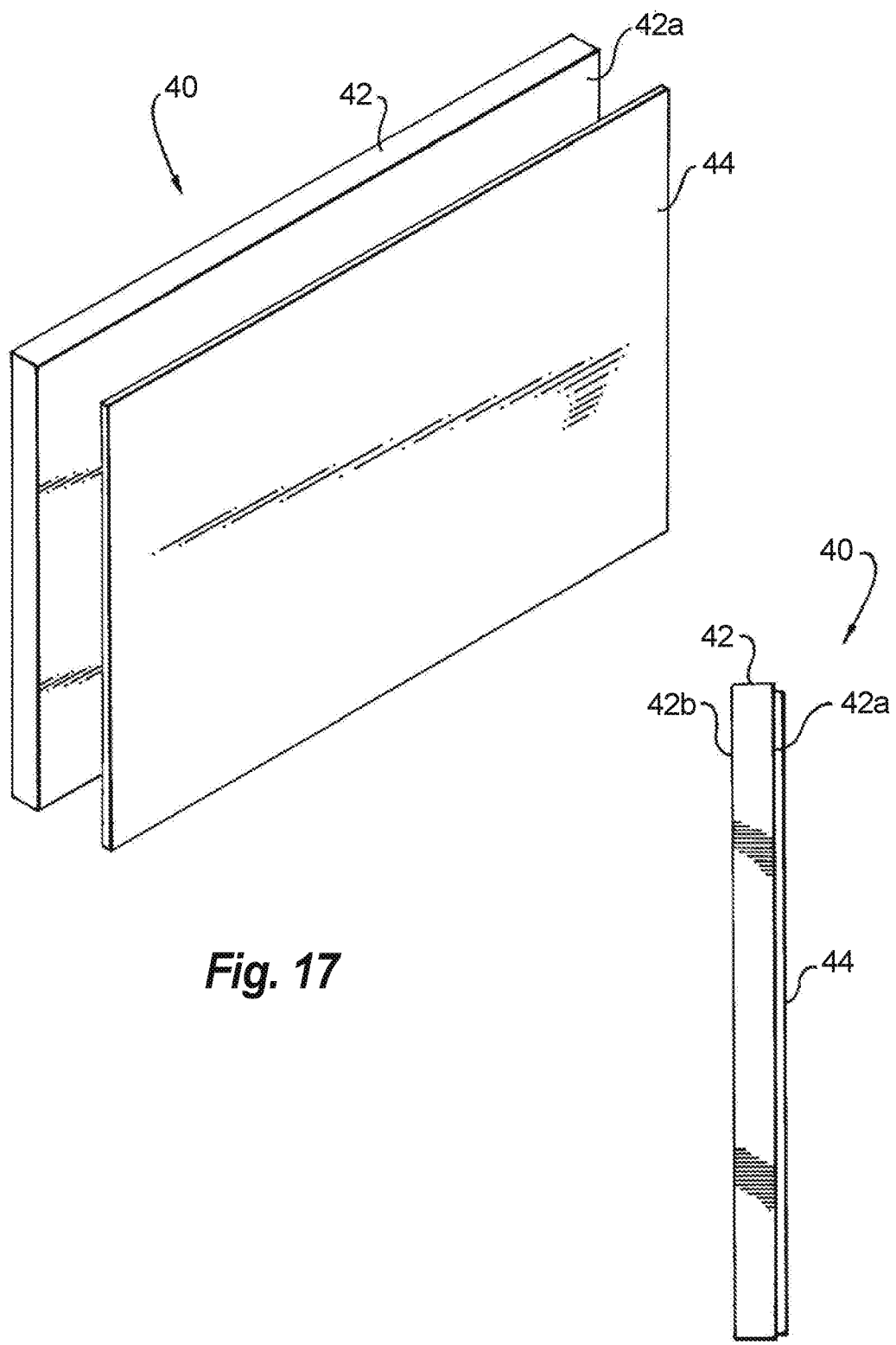
FIG. 17 is a perspective view of another exemplary configuration of the left side plate assembly or the right side plate assembly used in the noise reducing and cooling enclosure of FIG. 1.
FIG. 18 is a side elevation view of the left or right side plate assembly of FIG. 17.

Referring to FIGS. 14-16, the right side plate assembly 60 is a composite comprised of multiple layers. In this exemplary configuration, the right side plate assembly 60 comprises three layers, and is similar to the left side plate assembly 40. The first layer is an outer side wall 62 made of a rigid material having acoustic blocking capability and the capability to conduct heat from an inner surface 62a of the side wall 62 to an outer surface 62b of the side wall 62. An example of a rigid material having acoustic blocking capability and the capability to conduct heat is the aluminum foam described above. In this exemplary configuration, the first layer 62 may include an aperture 64 to permit connection components 65, as shown in FIG. 2, e.g., electrical wire leads, connected to the one or more devices in the enclosure 10, to pass through the first layer 62.

The second layer 66 of the right side plate assembly 60 is a plate made of a material that can conduct heat and acoustically quiet acoustic energy, e.g., audible noise, such as the thermal foam described above. The second layer 66 may be secured to the first layer 62 using an adhesive, such as an acrylic adhesive that may be part of the second layer 66 or applied to the second layer. The second layer 66 acoustically quiets noise generated by the one or more devices 12 within the enclosure 10, and conducts heat generated by the one or more devices 12 within the enclosure 10 to the first layer 62. The second layer 66 is preferably a thermally conductive silicone sponge material that can conduct heat and dampen audible noise, as described above. The second layer 66 may also include a perforated aperture 68 that is aligned with the aperture 64 in the side wall 62, and that may be removed to permit connection components 65, e.g., electrical wire leads seen in FIG. 3, to pass through the second layer 66 into aperture 64 in the side wall 62.

The third layer 70 of the right side plate assembly 60 is preferably a thermal pad, and is similar to the third layer 46 described above. The third layer 70 may be secured to the second layer 66 using an adhesive, such as an acrylic adhesive that may be part of the second layer 44 or applied to the second layer. The third layer 70 is made of a highly conformable, low hardness solid material, such as a silicone based material that can conduct heat from within the enclosure 10 toward the second layer 66. The third layer 70 may also include acoustic quieting capability to assist in reducing audible noise generated by the one or more devices 12 within the enclosure 10.

With the multi-layer right side plate assembly 60, heat generated within the enclosure 10 is conducted through the inner third layer 70 to the second layer 66. Heat from the second layer 66 is conducted to the outer first layer 62, which dissipates the heat through ambient air. Further, acoustic energy, e.g., audible noise, generated by the one or more devices 12 within the enclosure 10 is acoustically quieted by the third layer 70, and further acoustically quieted by the second layer 66, and then acoustically blocked from exiting the enclosure 10 by the first layer 62.

Figure 19:
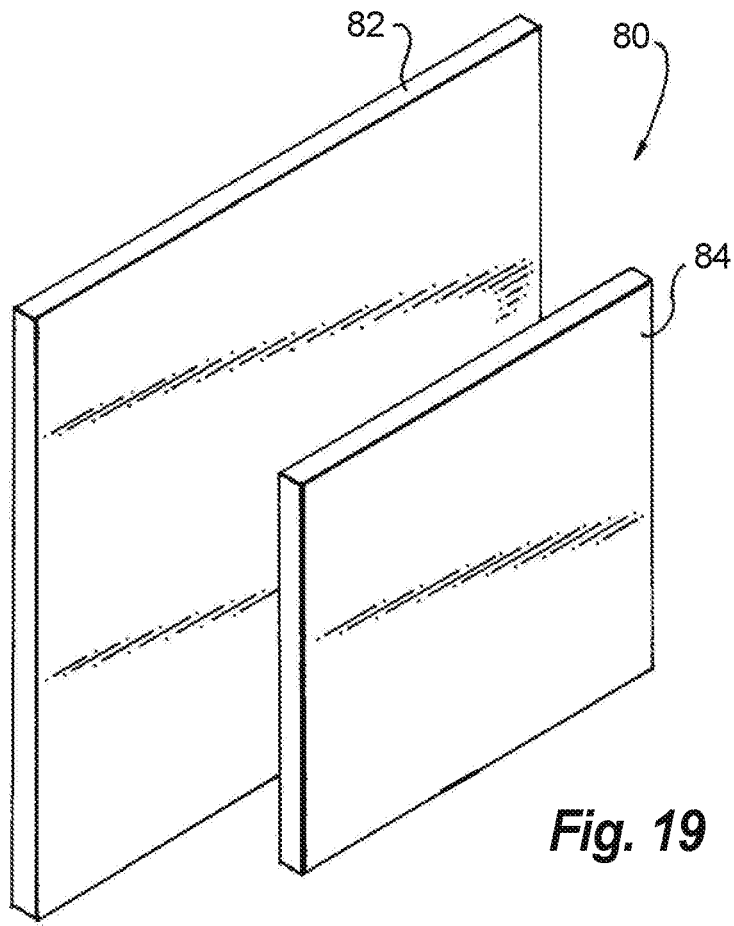
FIG. 19 is a perspective view of an exemplary configuration of plate assembly used to cover the front and rear of the noise reducing and cooling enclosure of FIG. 1.
Figure 21:
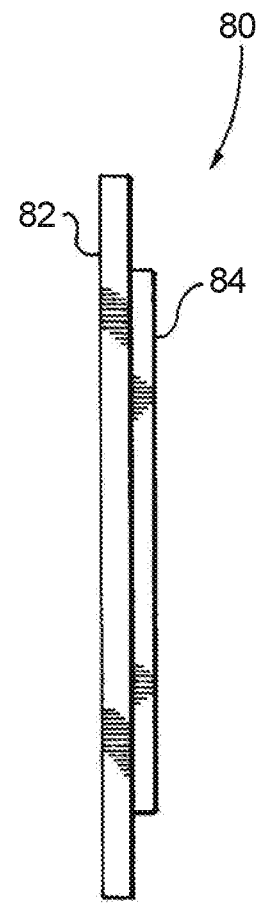
FIG. 21 is a side elevation view of the plate assembly of FIG. 19.
Figure 20:
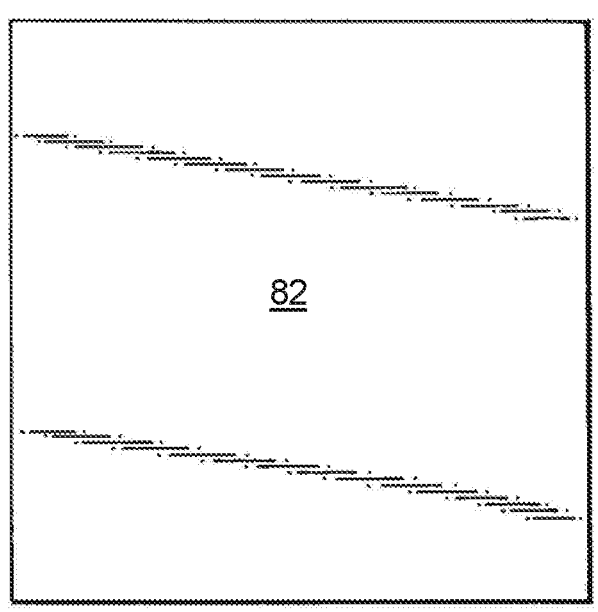
FIG. 20 is a plan view of a front or rear plate of the plate assembly of FIG. 19.

Referring to FIGS. 19-21, the front/rear plate assemblies 80 are composites comprised of multiple layers. In this exemplary configuration, the front and rear plate assemblies are not intended to come in contact with the one or more devices 12 within the enclosure 10. Each front/rear plate assembly 80 in this exemplary configuration comprises two layers. Preferably, the first layer is a rigid outer wall 82 for sealing either the front or rear of the enclosure, and for providing acoustic blocking capability. For example, a rigid outer wall 82 can be made of a fiber-epoxy board, such as GPO-1, manufactured by Rochling Glastic Composites. In another configuration, the first layer is an outer wall for sealing either the front or rear of the enclosure, and including acoustic quieting capability. For example, the outer wall in this exemplary configuration can be made of thermal foam. If the front and/or rear plate assemblies 80 may come in contact with the one or more devices 12 within the enclosure 10, then the outer wall can be made of the rigid material having acoustic blocking capability and the capability to conduct heat from an inside surface of the outer wall 82 to an outer surface of the outer wall. An example of the rigid material having acoustic blocking capability and the capability to conduct heat is the aluminum foam described above.

The second layer 84 of each front/rear plate assembly 80 is an inner plate made of a material that can acoustically quiet acoustic energy, e.g., audible noise, such as the thermal foam described above. The second layer 84 may be secured to the first layer 82 using an adhesive, such as an acrylic adhesive that may be part of the second layer 84 or applied to the second layer. The second layer 84 acoustically quiets acoustic energy, e.g., audible noise, generated by one or more devices 12 within the enclosure 10. The second layer 84 is preferably a silicone sponge material that can acoustically quiet acoustic energy, e.g., audible noise, as described above.

With the multi-layer front/rear plate assemblies 80, in one configuration described above, acoustic energy, e.g., audible noise, generated by the one or more devices 12 within the enclosure 10 is acoustically quieted by the second layer 84, and further acoustically blocked by the rigid first layer 82. In another configuration described above, acoustic energy generated by the one or more devices 12 within the enclosure 10 is acoustically quieted by the second layer 84, and further acoustically quieted by the first layer 82. In another configuration described above, acoustic energy generated by the one or more devices within the enclosure 10 is acoustically quieted by the second layer 84, and further acoustically blocked by the rigid outer wall first layer 82 made of a material having acoustic blocking capability and the capability to conduct heat so that heat from an inside surface of the outer wall 82 is conducted to an outer surface of the outer wall.

Figure 22:
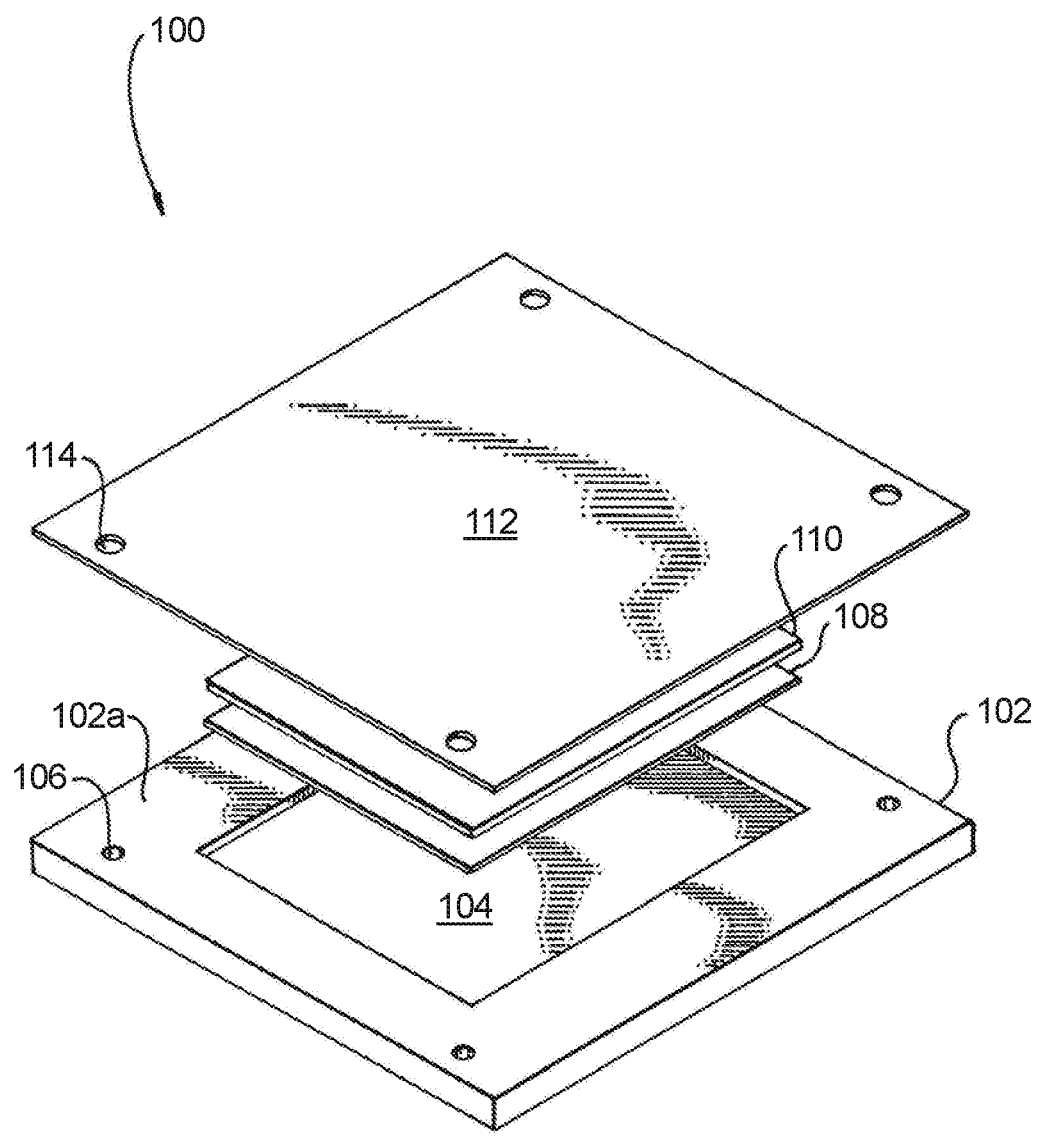
FIG. 22 is a perspective view of an exemplary configuration of a top plate assembly used in the noise reducing and cooling enclosure of FIG. 1.
Figure 23:
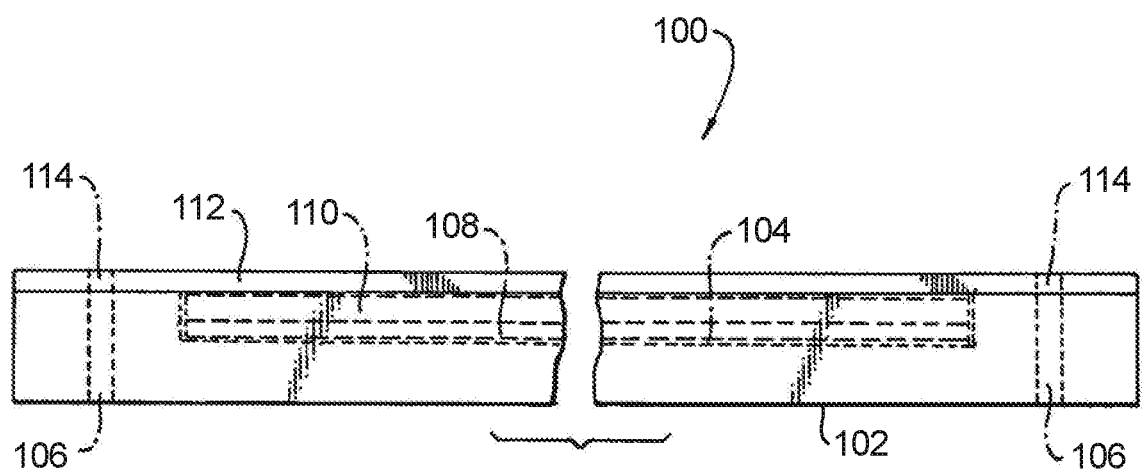
FIG. 23 is a side elevation view of the top plate assembly of FIG. 22.
Figure 24:
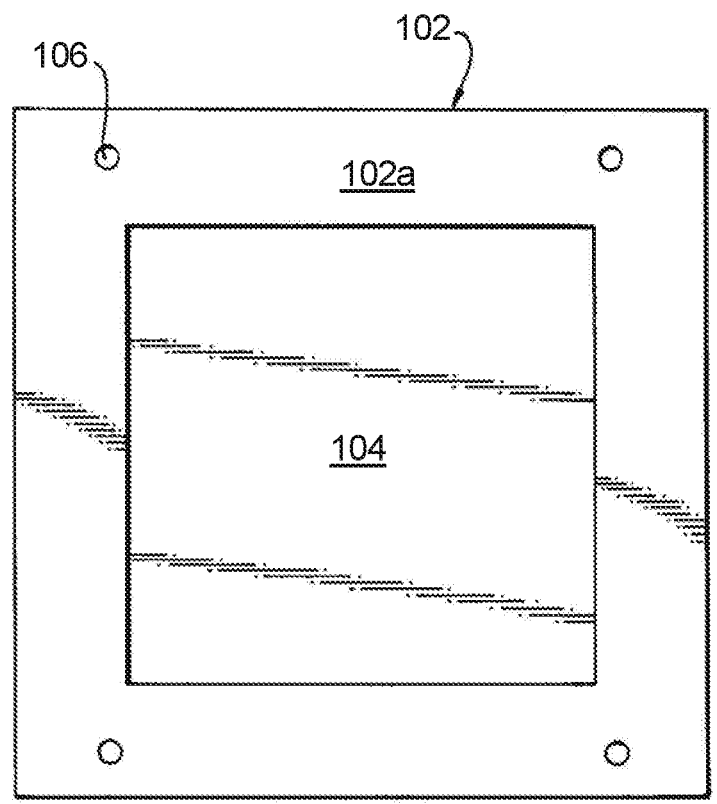
FIG. 24 is a plan view of an inner surface of a top of the base plate assembly of FIG. 22.
Figure 25:
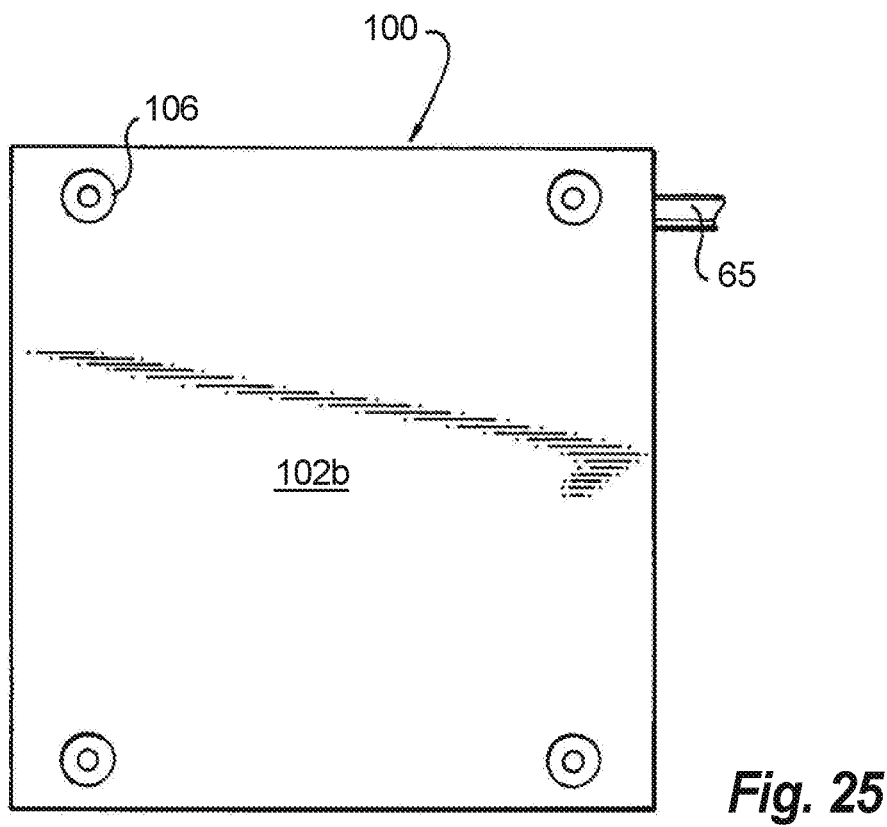
FIG. 25 is a plan view of an outer surface of a top of the base plate assembly of FIG. 22.
Figure 26:
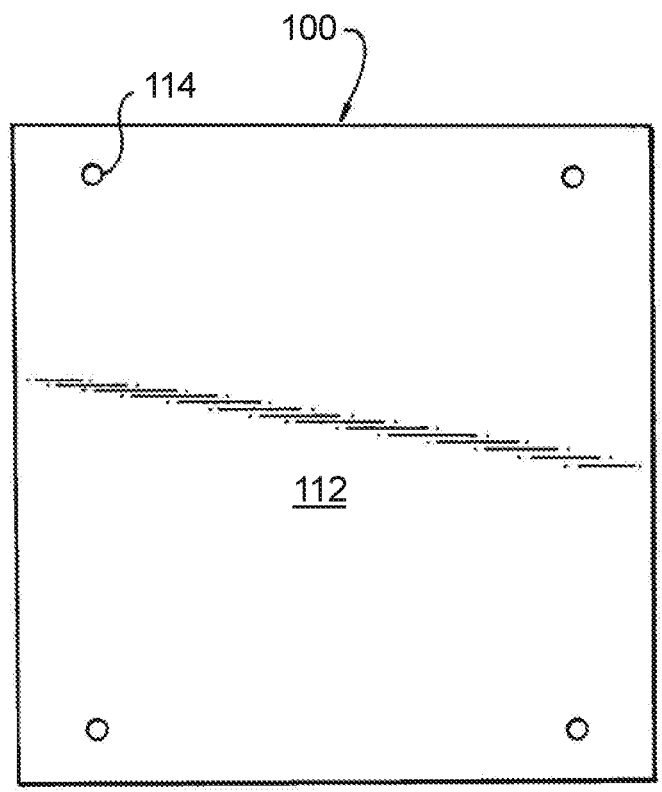
FIG. 26 is a plan view of a top plate of the top plate assembly of FIG. 22.

Referring to FIGS. 22-26, the top plate assembly 100 of the enclosure 10 will be described. In this exemplary configuration, the top plate assembly is similar to the base plate assembly, and is a composite comprised of multiple layers, e.g., four layers. The first layer is an outer top 102 made of a rigid material having acoustic blocking capability and the capability to conduct heat from an inside surface 102a of the first layer 102 to an outer surface 102b (seen in FIG. 25) of the first layer 102. An example of a rigid material having acoustic blocking capability and the capability to conduct heat is the aluminum foam described above. The first layer 102 has a recess 104 (seen in FIGS. 22-24) in the inside surface 102a configured to receive a second layer 108 and a third layer 110 of the top plate assembly 100 so as to position the second layer 108 and the third layer 110 relative to the first layer 102, as seen in FIG. 23. The positioning of the second layer and the third layer is such that the one or more devices 12 to be housed within the enclosure 10 can rest against the top plate assembly 100 near the recess area 104. Around the perimeter of the first layer 102 near the corners are apertures 106 for receiving a threaded rod used to secure the top plate assembly 100 to the base plate assembly 20, as will be described below.

The second layer 108 of the top plate assembly 100 is a plate made of a rigid, thermally conductive material, such as a thermally conductive metal. An example of a thermally conductive metal is aluminum. The second layer 108 is configured to fit within the recess 104 in the first layer 102, as shown in FIGS. 22 and 23. The second layer 108 conducts heat within the enclosure 10 to the first layer 102. The second layer 108 also provides additional structural integrity to the top plate assembly 100.

The third layer 110 of the top plate assembly 100 is dimensioned to be about the same size as the second layer 108, but may have a different thickness. The third layer 110 rests on the second layer 108 within the recess 104, as shown in FIGS. 22 and 23. The third layer 110 is made of a highly conformable, low hardness solid material, such as a silicone based material, that can conduct heat from within the enclosure 10 toward the second layer 108. Preferably, third layer 110 is a thermal pad similar to the thermal pads described above. The third layer 110 may also include acoustic quieting capability to assist in reducing acoustic energy, e.g., audible noise, generated by the one or more devices 12 within the enclosure 10. The third layer 110 can also fill air gaps between the second layer 108 and the fourth layer 112, which may be caused by imperfect surfaces, to ensure thermal contact between the layers.

The fourth layer 112 of the top plate assembly 100 is an inner plate made of a material that can conduct heat and acoustically quiet acoustic energy, e.g., audible noise, such as the thermal foam described above, which devices to be housed within the enclosure 10 may contact. The fourth layer 112 and first layer 102 sandwich the second layer 108 and the third layer 110 within the recess 104 in the first layer 102. Around the perimeter of the fourth layer 112 near the corners are apertures 114 that are aligned with apertures 106 in first layer 102, and are used when securing the top plate assembly 100 to the base plate assembly 20. The fourth layer 112 may be secured to the third layer 110 and portions of the first layer 102 using an adhesive, such as an acrylic adhesive that may be part of the fourth layer 112 or applied to the fourth layer. The fourth layer 112 acoustically quiets acoustic energy, e.g., audible noise, generated by one or more devices 12 within the enclosure 10, and conducts heat generated by the one or more devices within the enclosure 10 to the third layer 110 in the area of the recess 104, and to the first layer 102 in places where the fourth layer 112 is in direct contact with the first layer 102.

With the multi-layer top plate assembly 100, heat generated within the enclosure 10 is conducted through the inner fourth layer 112 to the third layer 110 which conducts the heat to the second layer 108, and from the inner fourth layer 112 to the first layer 102 in areas where the fourth layer is in direct contact with the first layer. The second layer 108 then conducts the heat to the first layer 102 which dissipates the heat through the ambient air. Further, acoustic energy, e.g., audible noise, generated by the one or more devices 12 within the enclosure 10 is acoustically quieted by the fourth layer 112, and further acoustically quieted by the third layer 110, and then acoustically blocked from exiting the enclosure 10 by the first layer 102.

Figure 3:
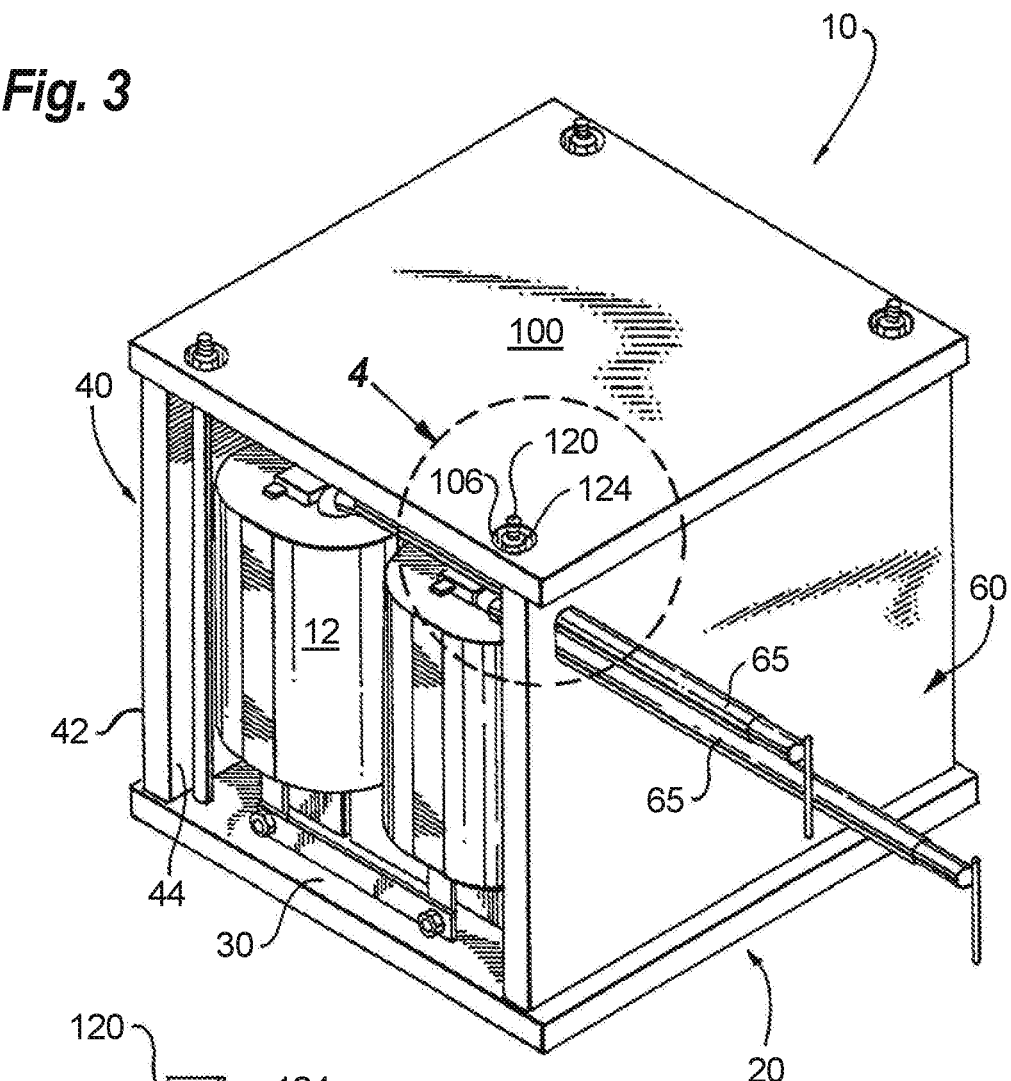
FIG. 3 is a front perspective view of the noise reducing and cooling enclosure of FIG. 1 with a front plate assembly removed.
Figure 4:
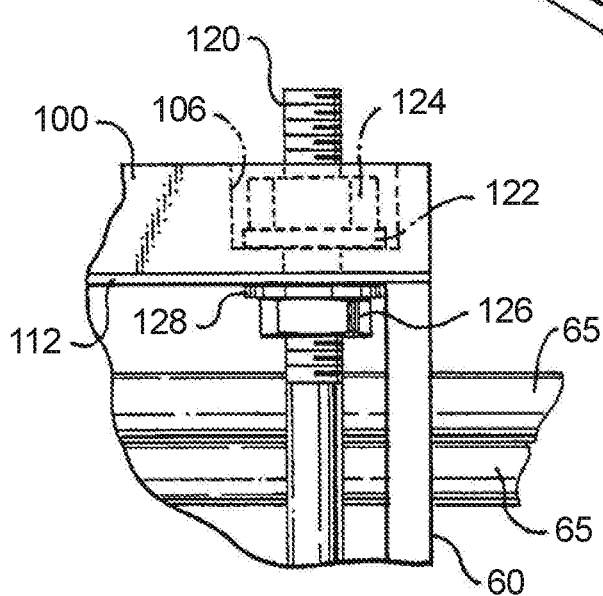
FIG. 4 is a side elevation view of a connection point between a top plate assembly to the noise reducing and cooling enclosure of FIG. 1.
Figure 5:
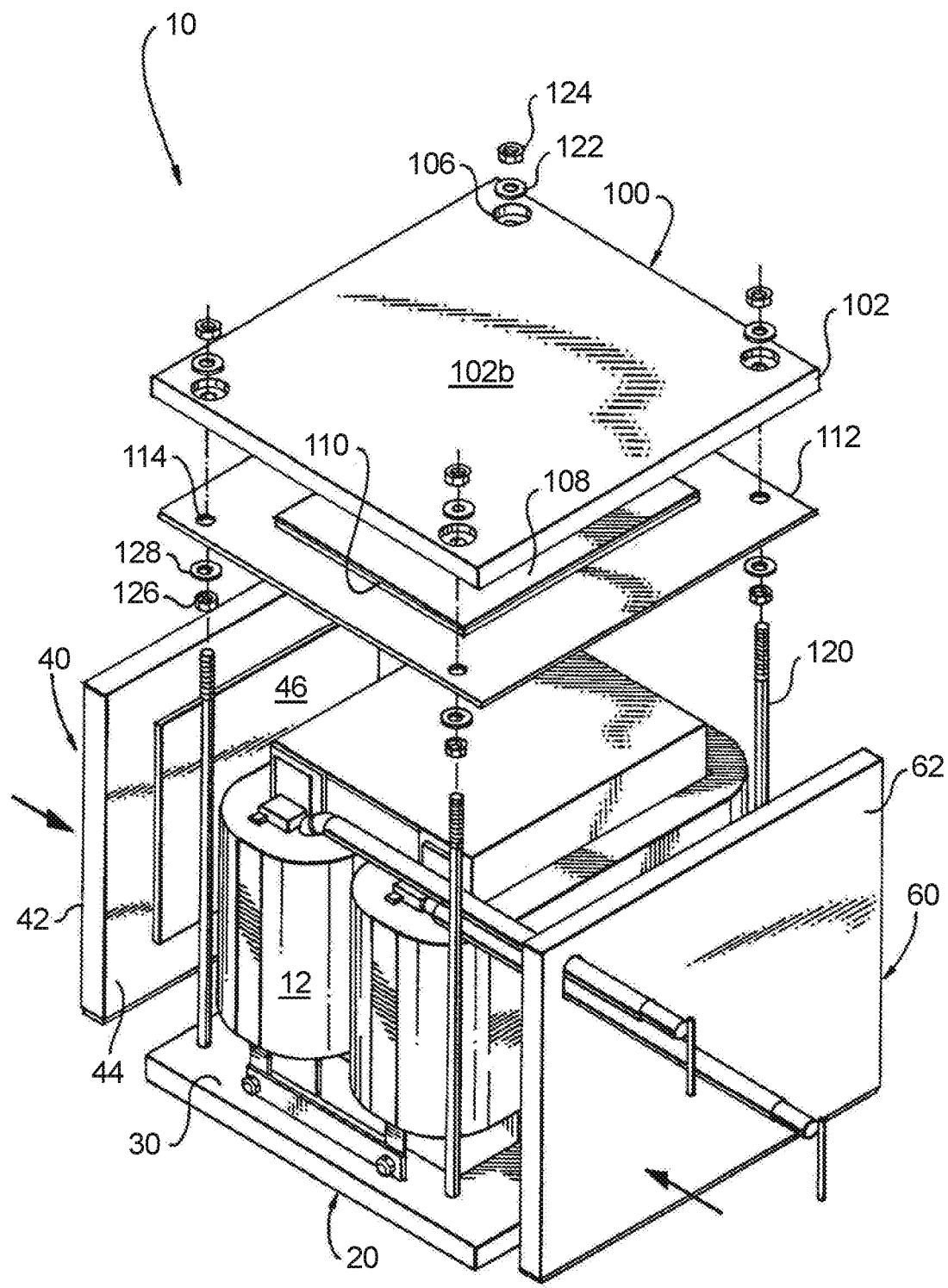
FIG. 5 is an exploded front perspective view of the noise reducing and cooling enclosure of FIG. 1.

Returning to FIGS. 1-6, assembly of the various plates to form the enclosure will be described. One or more devices 12 are placed on the fourth layer 30 of the base plate assembly 20. As described above, the base plate assembly 20 includes threaded nuts 25 within apertures 23. Threaded rods 120, e.g., nylon threaded rods, are inserted into apertures 32 of the fourth layer 30 and apertures 23 of the first layer 22, and secured to the threaded nut 25. The top plate assembly 100 is then positioned over the one or more devices 12 by passing the threaded rods 120 through the respective apertures 114 in the fourth layer 112 and apertures 106 in the first layer 102. The left side plate assembly 40 and right side plate assembly 60 are then positioned on the base plate assembly 20 so that the left side plate assembly 40 and right side plate assembly 60 are positioned between the base plate assembly 20 and the top plate assembly 100, as seen by the arrows in FIG. 5. The top plate assembly is then secured to the base plate assembly 20 by inserting washers 122, e.g., nylon or rubber washers, over the threaded rods 120 and tightening nuts 124, e.g., nylon nuts, thereby compressing the left side plate assembly 40 and the right side plate assembly 60 between the base plate assembly 20 and the top plate assembly 100 for a wedge fit, as seen in FIGS. 2 and 3. As an alternative or in addition to, an adhesive, such as RTV silicone adhesive, may be used to secure the left side plate assembly 40 and the right side plate assembly 60 between the base plate assembly 20 and the top plate assembly 100. The front and rear plate assemblies 80 are then secured to the base plate assembly 20, the left side plate assembly 40, the right side plate assembly 60, and the top plate assembly 100, as shown in FIGS. 1 and 2, to seal the front and rear of the enclosure 10. The front and rear plate assemblies 80 can be secured to the other plate assemblies using, for example, an adhesive, such as RTV silicone adhesive. Positioning of the height of the top assembly relative to the devices 12 may be achieved by nut 126, e.g., nylon nuts, threaded on the rod 120 and washer 128, e.g., rubber washers, as shown in FIG. 4.

Figure 27:
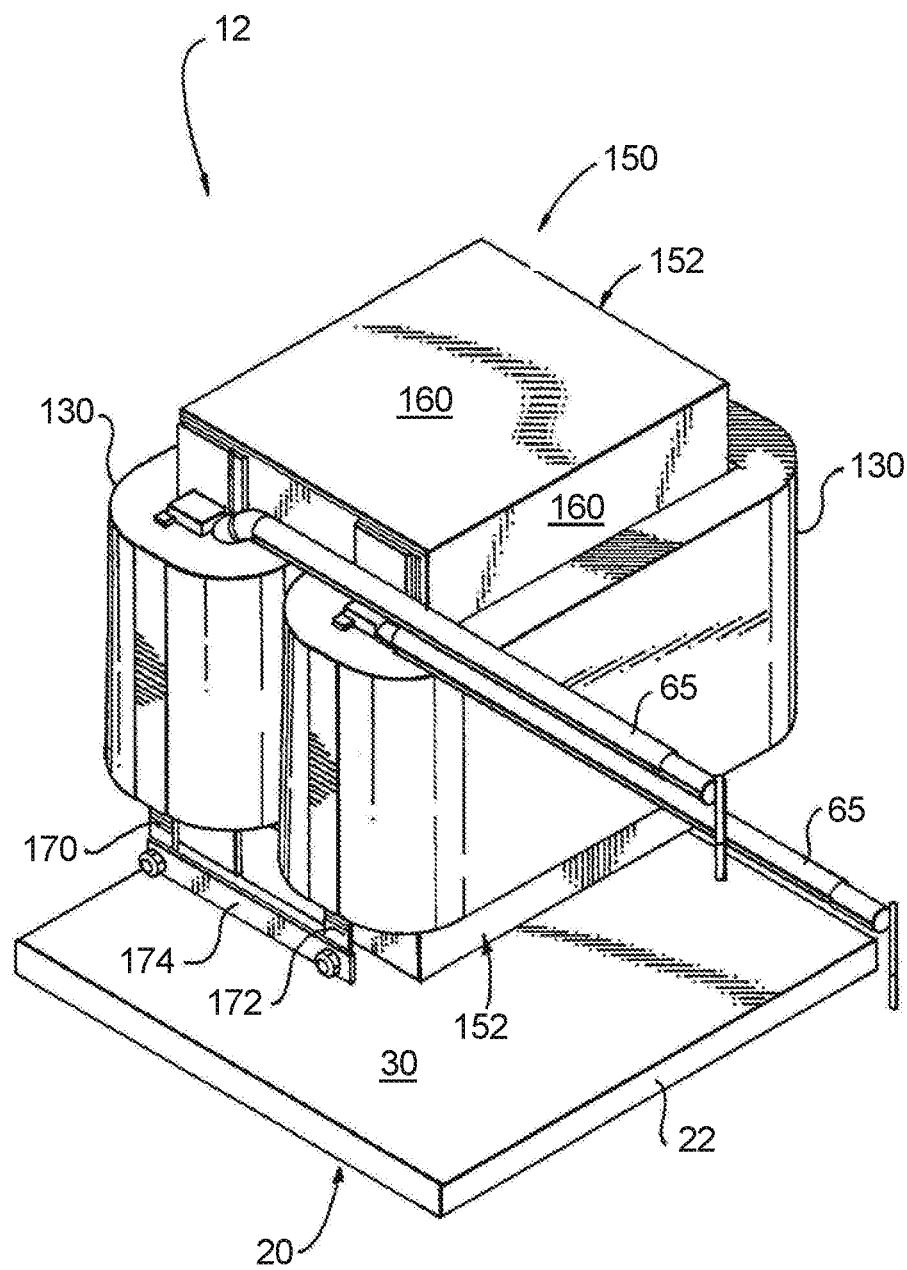
FIG. 27 is a front perspective view of an exemplary coil assembly that can be mounted within the noise reducing and cooling enclosure of FIG. 1.
Figure 28:
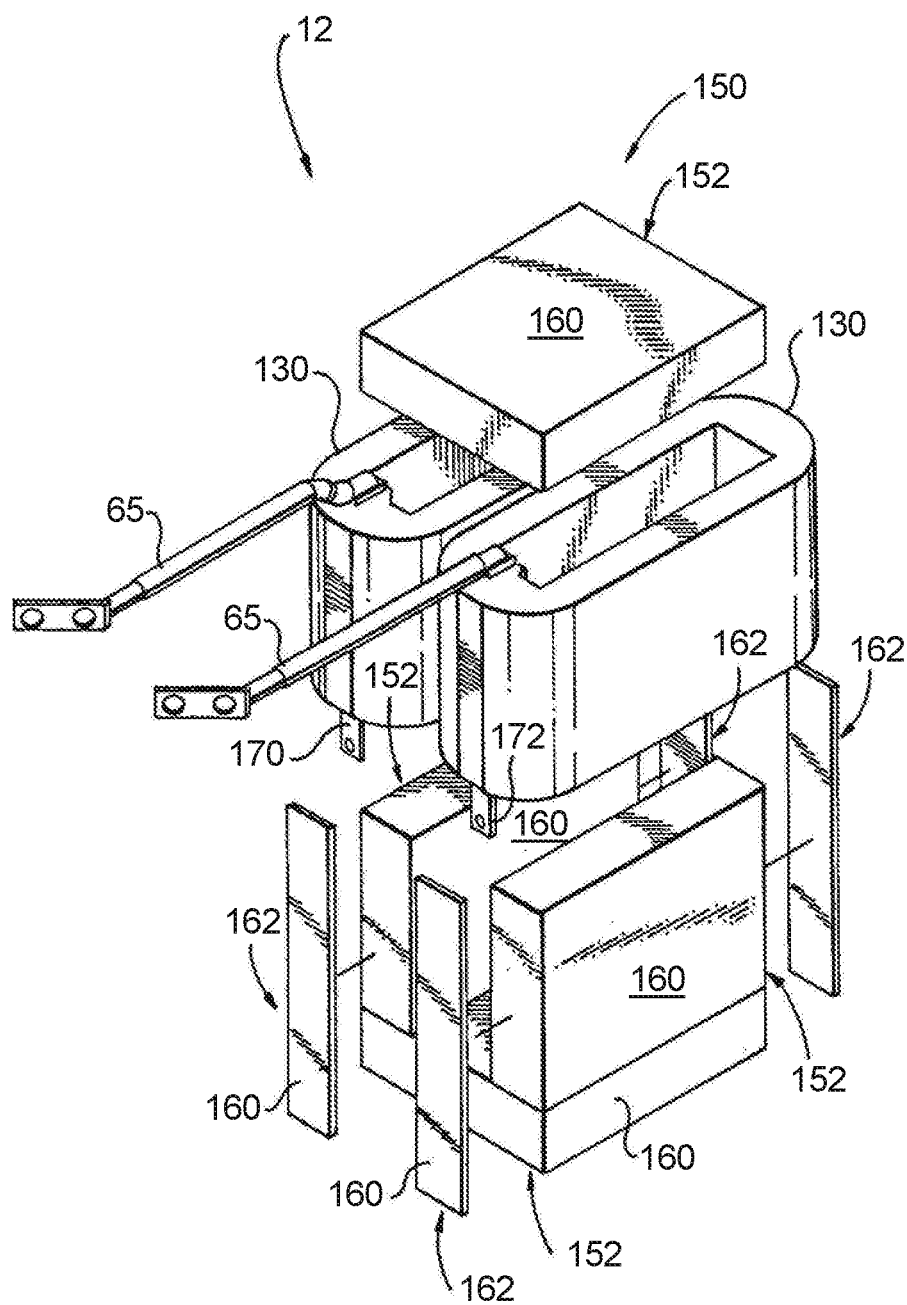
FIG. 28 is an expanded side perspective view of the exemplary coil assembly of FIG. 27.
Figure 29:
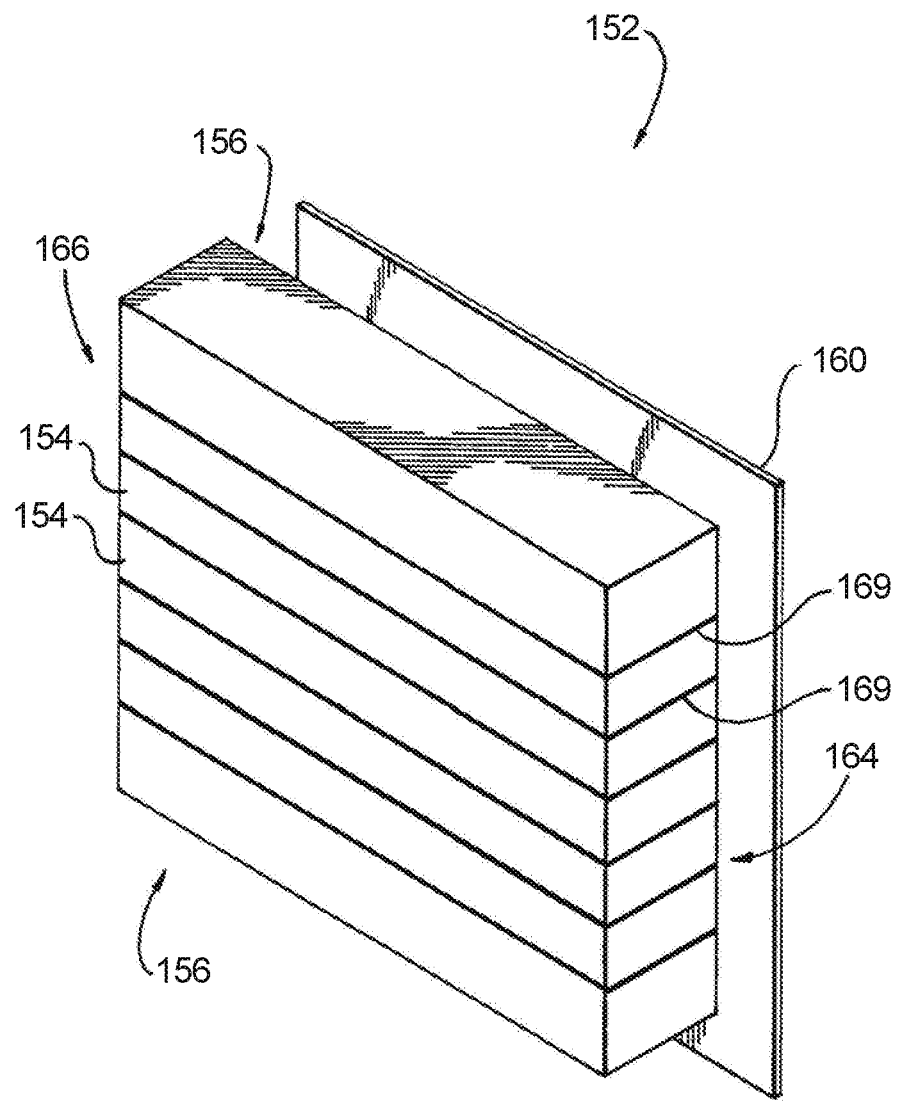
FIG. 29 is a perspective view of an exemplary magnetic core leg used in the exemplary coil assembly of FIG. 27.
Figure 30:
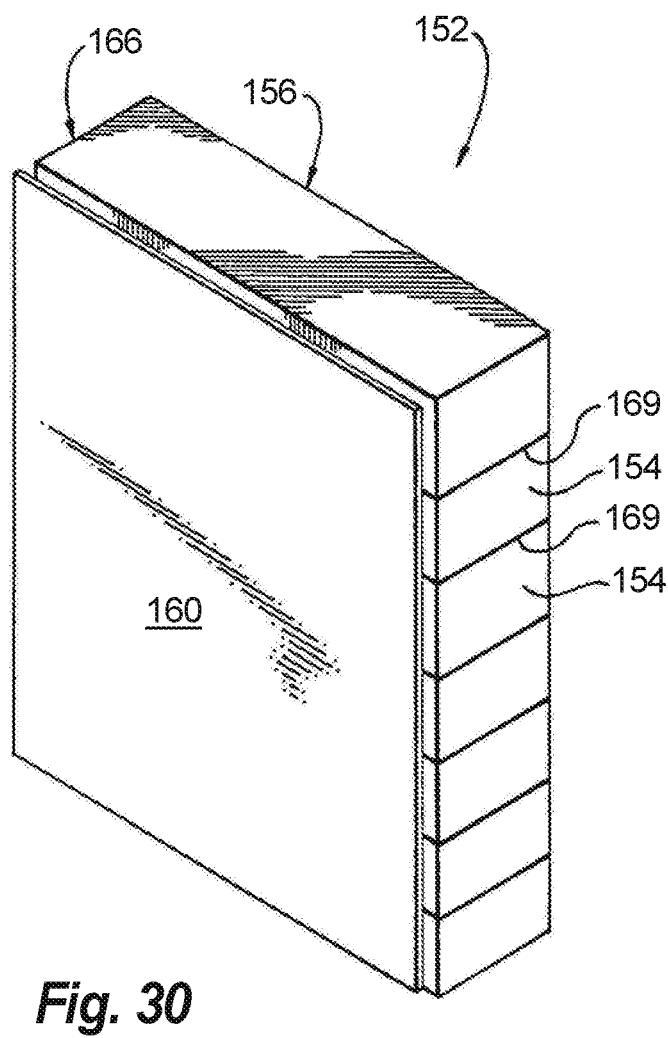
FIG. 30 is a perspective view of an exemplary magnetic core leg used in the exemplary coil assembly of FIG. 27.
Figure 31:
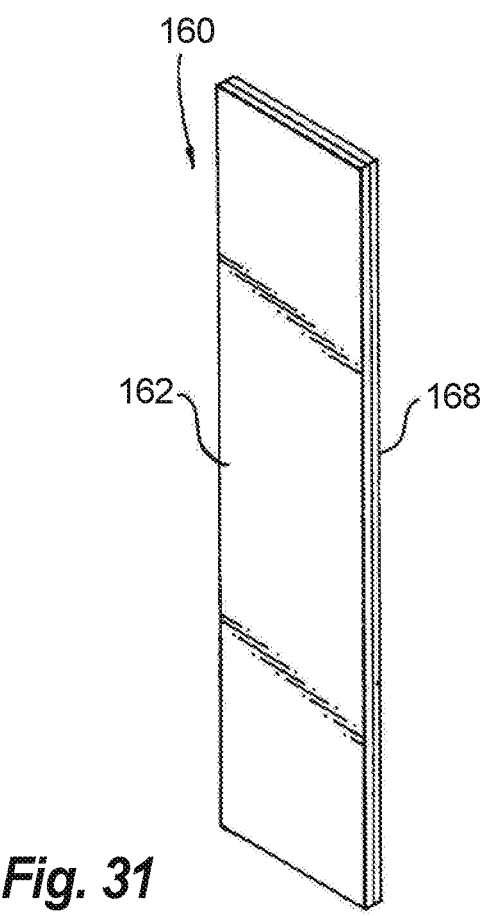
FIG. 31 is a perspective view of an exemplary keeper used in the exemplary coil assembly of FIG. 27.

Referring to FIGS. 27-31, an exemplary device 12 that may be housed within the enclosure of the present disclosure is shown. In this configuration, the device 12 is an inductor, such as a sine wave inductor, used in power circuits. The device 12 includes a pair of coils 130 having a hollow center, a core assembly 150 and connector components 65, e.g., a pair of wire leads that are electrically connected to the pair of coils 130, as shown. The pair of coils 130 are a side-by-side relationship, as shown in FIGS. 27 and 28, and are preferably foil wound coils. The core assembly 150 includes four core legs 152. Two of the four core legs 152 are positioned within the hollow portion of the coils 130, and two of the four core legs 152 extend across other two core legs to form a rectangle or square, as shown in FIG. 27. As seen in FIG. 29, each core leg 152 is in this exemplary configuration formed of a plurality of smaller core blocks 154 secured together, using an adhesive, such as RTV silicon adhesive, with a gapping material 169, such as GPO-1, manufactured by Rochling Glastic Composites, in a stack to form a block. The smaller core blocks 154 are preferably made of a ferrous material. To provide additional acoustic quieting capability, the long surfaces 156 of each core leg 152 can include a layer of, for example thermal foam, similar to the thermal foam described above. A keeper 162 is secured to the front surface 164 and the rear surface 166 of each core leg 152 to align the core legs positioned within the hollow portion of each coil 130, and to conduct heat away from the core leg 152. Each keeper 162 includes an aluminum inner layer 168, and an outer layer 160 made of thermal foam, similar to the thermal foam described above. As shown in FIGS. 27 and 28, one wire lead 65 is electrically coupled to one of the two coils 130 via terminal connection 170, and the other wire lead 65 is electrically coupled to the other coil 130 via terminal connection 172. The two terminal connections 170 and 172 are then interconnected using terminal bar 174 to complete the electrical circuit between the wire leads 65 and the coils 130.

While illustrative configurations of the present disclosure have been described and illustrated above, it should be understood that these are exemplary of the disclosure and are not to be considered as limiting. Additions, deletions, substitutions, and other modifications can be made without departing from the spirit or scope of the present disclosure. Accordingly, the present disclosure is not to be considered as limited by the foregoing description.

What is claimed is:

1. A device housed within an enclosure, comprising:
    a noise emitting device housed within an enclosure, the enclosure comprising:
        a base plate assembly having first layer formed of a rigid thermally conductive and acoustic blocking material, a second layer made of a rigid thermally conductive material, a third layer made of a thermally conductive and acoustic quieting material, and a fourth layer made of a thermally conductive and acoustic quieting material;
        a top plate assembly having first layer formed of a rigid thermally conductive and acoustic blocking material, a second layer made of a rigid thermally conductive material, a third layer made of a thermally conductive and acoustic quieting material, and a fourth layer made of a thermally conductive and acoustic quieting material;
        a left side plate assembly having first layer formed of a rigid thermally conductive and acoustic blocking material, a second layer made of a thermally conductive and acoustic quieting material, and a third layer made of a thermally conductive and acoustic quieting material;
        a right side plate assembly having first layer formed of a rigid thermally conductive and acoustic blocking material, a second layer made of a thermally conductive and acoustic quieting material, and a third layer made of a thermally conductive and acoustic quieting material;
        a rear plate assembly having a first layer made of a rigid, acoustic blocking material, and a second layer made of an acoustic quieting material; and
        a front plate assembly having a first layer made of a rigid, acoustic blocking material, and a second layer made of an acoustic quieting material.

2. The device housed within an enclosure according to claim 1, wherein the rigid thermally conductive and acoustic blocking material of the first layer of the base plate assembly, the first layer of the top plate assembly, the first layer of the left side plate assembly and the first layer of the right side plate assembly comprises aluminum foam.

3. The device housed within an enclosure according to claim 1, wherein the rigid thermally conductive material of the second layer of the base plate assembly and the second layer of the top plate assembly comprises aluminum.

4. The device housed within an enclosure according to claim 1, wherein the thermally conductive and acoustic quieting material of the third layer of the base plate assembly, the third layer of the top plate assembly, the third layer of the left side plate assembly and the third layer of the right side plate assembly comprises a thermal pad.

5. The device housed within an enclosure according to claim 1, wherein the thermally conductive and acoustic quieting material of the fourth layer of the base plate assembly, the fourth layer of the top plate assembly, the second layer of the left side plate assembly and the second layer of the right side plate assembly comprises thermal foam.

6. The device housed within an enclosure according to claim 1, wherein the noise emitting device comprises an inductor.

7. The device housed within an enclosure according to claim 6, wherein the inductor comprises a sine wave inductor.

* * * * *

UNITED STATES PATENT AND TRADEMARK OFFICE
CERTIFICATE OF CORRECTION

| | | |
|---|---|---|
| PATENT NO. | : 10,943,723 B2 | Page 1 of 1 |
| APPLICATION NO. | : 15/464444 | |
| DATED | : March 9, 2021 | |
| INVENTOR(S) | : Kenneth Edward Pagenkopf | |

It is certified that error appears in the above-identified patent and that said Letters Patent is hereby corrected as shown below:

On the Title Page

(73) Assignee should read: HUBBELL INCORPORATED (Shelton, CT)

Signed and Sealed this
Thirtieth Day of November, 2021

Drew Hirshfeld
*Performing the Functions and Duties of the*
*Under Secretary of Commerce for Intellectual Property and*
*Director of the United States Patent and Trademark Office*